(12) United States Patent
Ichikawa et al.

(10) Patent No.: US 10,830,991 B2
(45) Date of Patent: Nov. 10, 2020

(54) SINGLE-FOCUS OPTICAL SYSTEM AND OPTICAL APPARATUS USING THE SAME

(71) Applicant: OLYMPUS CORPORATION, Hachioji (JP)

(72) Inventors: Keisuke Ichikawa, Tama (JP); Shinichi Mihara, Tama (JP)

(73) Assignee: OLYMPUS CORPORATION, Tokyo (JP)

(*) Notice: Subject to any disclaimer, the term of this patent is extended or adjusted under 35 U.S.C. 154(b) by 140 days.

(21) Appl. No.: 16/147,677

(22) Filed: Sep. 29, 2018

(65) Prior Publication Data

US 2019/0033563 A1    Jan. 31, 2019

Related U.S. Application Data

(63) Continuation of application No. PCT/JP2016/060305, filed on Mar. 30, 2016.

(51) Int. Cl.
*G02B 9/62* (2006.01)
*G02B 13/04* (2006.01)
(Continued)

(52) U.S. Cl.
CPC ............... *G02B 9/62* (2013.01); *G02B 9/34* (2013.01); *G02B 13/004* (2013.01);
(Continued)

(58) Field of Classification Search
None
See application file for complete search history.

(56) References Cited

U.S. PATENT DOCUMENTS 5,412,507 A * 5/1995 Sato .................... G02B 15/173
                                                    359/687
8,526,128 B2 * 9/2013 Kubota .................. G02B 9/64
                                                    359/762
(Continued)

FOREIGN PATENT DOCUMENTS

JP         2004101880 A    4/2004
JP         2009109723 A    5/2009
(Continued)

OTHER PUBLICATIONS

International Preliminary Report on Patentability (IPRP) and Written Opinion dated Oct. 2, 2018 issued in International Application No. PCT/JP2016/060305.

(Continued)

*Primary Examiner* — Darryl J Collins
(74) *Attorney, Agent, or Firm* — Holtz, Holtz & Volek PC

(57) ABSTRACT

A single-focus optical system includes a front lens unit and a rear lens unit. The front lens unit either includes a predetermined sub lens unit or includes an enlargement-side sub lens unit and a predetermined sub lens unit. The rear lens unit includes a first sub lens unit, a second sub lens unit, a third sub lens unit, and a fourth sub lens unit. The enlargement-side sub lens unit includes a negative lens component. The predetermined sub lens unit includes an enlargement-side meniscus lens component and a reduction-side meniscus lens component. The first sub lens unit includes positive lenses and a first predetermined negative lens. The second sub lens unit includes a predetermined negative lens component. The third sub lens unit includes a predetermined positive lens component. The fourth sub lens unit includes all lens components positioned on the reduction side of the predetermined positive lens component.

25 Claims, 9 Drawing Sheets

(51) Int. Cl.
  *G02B 13/00* (2006.01)
  *G02B 13/18* (2006.01)
  *G02B 9/34* (2006.01)
(52) U.S. Cl.
  CPC ......... *G02B 13/0045* (2013.01); *G02B 13/04* (2013.01); *G02B 13/18* (2013.01)

(56) References Cited

U.S. PATENT DOCUMENTS

| | | |
|---|---|---|
| 2009/0109551 A1 | 4/2009 | Hatada |
| 2010/0033848 A1 | 2/2010 | Hatada |
| 2010/0290133 A1 | 11/2010 | Sano et al. |
| 2011/0002046 A1 | 1/2011 | Wada et al. |
| 2011/0032606 A1 | 2/2011 | Imaoka |
| 2011/0090574 A1 | 4/2011 | Harada et al. |
| 2012/0044575 A1* | 2/2012 | Saori ............. G02B 13/04 359/680 |
| 2012/0257100 A1 | 10/2012 | Imaoka et al. |
| 2013/0293767 A1 | 11/2013 | Imaoka et al. |
| 2017/0108673 A1* | 4/2017 | Ichikawa ............. G02B 5/005 |

FOREIGN PATENT DOCUMENTS

| | | |
|---|---|---|
| JP | 2009210692 A | 9/2009 |
| JP | 2010039340 A | 2/2010 |
| JP | 2010097207 A | 4/2010 |
| JP | 2010128480 A | 6/2010 |
| JP | 2010266577 A | 11/2010 |
| JP | 2011013469 A | 1/2011 |
| JP | 2011053663 A | 3/2011 |
| JP | 2011059290 A | 3/2011 |
| JP | 2012226309 A | 11/2012 |

OTHER PUBLICATIONS

International Search Report (ISR) dated Jun. 28, 2016 issued in International Application No. PCT/JP2016/060305.
Written Opinion dated Jun. 28, 2016 issued in International Application No. PCT/JP2016/060305.

* cited by examiner

SA         AS         DT         CC
FNO 1.428  ω 35.00    ω 35.00    ω 35.00

-0.20    0.20    -0.20    0.20    -10.00    10.00    -0.02    0.02
 (mm)            (mm)              (%)               (mm)

SINGLE-FOCUS OPTICAL SYSTEM AND OPTICAL APPARATUS USING THE SAME

CROSS-REFERENCE TO RELATED APPLICATION

The present application is continuation application of International Application No. PCT/JP2016/060305 filed on Mar. 30, 2016, the entire contents of which are incorporated herein by reference.

BACKGROUND OF THE INVENTION

Field of the Invention

The present invention relates to a single-focus optical system, and an optical apparatus using the same.

Description of the Related Art

As a type of an image forming optical system having a high imaging performance, a Gaussian type has been known. An optical system of Gaussian type includes in order from an object side, a front unit, an intermediate unit, and a rear unit. The front unit includes one to three positive lens components. The intermediate unit includes two meniscus lens components in which concave surfaces thereof are face-to-face. The rear unit includes one to three positive lens components.

Moreover, in the Gaussian type optical system, a shape on the object side and a shape on an image side is, by and large, symmetrical about a central portion thereof, and moreover, the Gaussian type optical system has a concentric shape. In the concentric shape, a center of curvature of two lens surfaces in each lens is positioned near the central portion.

Accordingly, in the Gaussian type optical system, even with a large aperture ratio, each aberration is corrected favorably to some extent. However, when an attempt is made to realize an imaging performance superior to that of the conventional one, in the Gaussian type optical system, an angle of view slightly smaller than 50 degrees is the limit. Therefore, in the Gaussian type optical system, realization of the wide angle of view not smaller than 50 degrees is difficult.

Various types of wide-angle taking lenses in which these issues are solved, have been proposed. In the wide-angle taking lens that has been proposed, an F-number is about 1.4. As examples of an optical system of wide-angle taking lens with a wide angle of view and a small F-number, optical systems disclosed in Japanese Patent Application Laid-open Publication No. 2012-226309, Japanese Patent Application Laid-open Publication No. 2004-101880, Japanese Patent Application Laid-open Publication No. 2009-109723, Japanese Patent Application Laid-open Publication No. 2010-039340, Japanese Patent Application Laid-open Publication No. 2010-097207, and Japanese Patent Application Laid-open Publication No. 2011-059290 are known.

SUMMARY OF THE INVENTION

A single-focus optical system of the present invention is a single-focus optical system which forms a conjugate relationship between a conjugate point on an enlargement side where a distance is long and a conjugate point on a reduction side where a distance is short, and comprises in order from the enlargement side, a front lens unit, and
a rear lens unit, wherein
the front lens unit either includes a predetermined sub lens unit or includes in order from the enlargement side, an enlargement-side sub lens unit and the predetermined sub lens unit, and
the rear lens unit includes in order from the enlargement side, a first sub lens unit, a second sub lens unit, a third sub lens unit, and a fourth sub lens unit, and
a lens component is one of a single lens and a cemented lens, and
the enlargement-side sub lens unit, in order from the enlargement side, either includes only one negative lens component or includes a plurality of negative lens components, and
the predetermined sub lens unit includes an enlargement-side meniscus lens component and a reduction-side meniscus lens component, and
the enlargement-side meniscus lens component and the reduction-side meniscus lens components are disposed such that respective concave surfaces thereof are face-to-face, and
the first sub lens unit includes a plurality of positive lenses and a first predetermined negative lens, and
in the first predetermined negative lens, a lens surface on the enlargement side is concave toward the enlargement side, and
one positive lens of the plurality of positive lenses is cemented to the reduction side of the first predetermined negative lens, and
the second sub lens unit includes a predetermined negative lens component, and
in the predetermined negative lens component, a lens surface on the reduction side is concave toward the reduction side, and
the third sub lens unit includes a predetermined positive lens component which is positioned closest to the reduction side, and
the fourth sub lens unit includes all lens components that are positioned on the reduction side of the predetermined positive lens component.

Another single-focus optical system of the present invention is a single-focus optical system which forms a conjugate relationship between a conjugate point on an enlargement side where a distance is long and a conjugate point on a reduction side where a distance is short, and comprises in order from the enlargement side, a front lens unit, and
a rear lens unit, wherein
the front lens unit includes in order from the enlargement side, an enlargement-side sub lens unit and a predetermined sub lens unit, and
the rear lens unit includes in order from the enlargement side, a first sub lens unit, a second sub lens unit, a third sub lens unit, and a fourth sub lens unit, and
a lens component is one of a single lens and a cemented lens, and
the enlargement-side sub lens unit, in order from the enlargement side, either includes only one negative lens component or includes a plurality of negative lens components, and
the predetermined sub lens unit includes an enlargement-side meniscus lens component and a reduction-side meniscus lens component, and the enlargement-side meniscus lens component and the reduction-side meniscus lens component are disposed such that respective concave surfaces thereof are face-to-face, and the first sub lens unit includes a plurality of positive lenses and a first predetermined negative lens, and in the first predetermined negative lens, a lens surface on the enlargement side is concave toward the enlargement side, and one positive lens of the plurality of positive lenses is cemented to the reduction side of the first predetermined negative lens, and the second sub lens unit includes a predetermined negative lens component, and in the predetermined negative lens component, a lens surface on the reduction side is concave toward the reduction side, and the third sub lens unit includes a predetermined positive lens component which is positioned closest to the reduction side, and the fourth sub lens unit includes all lens components that are positioned on the reduction side of the predetermined positive lens component.

Moreover, an optical apparatus of the present invention comprises:

an optical system, and an image pickup element which is disposed on a reduction side, wherein the image pickup element has an image pickup surface, and converts an image formed on the image pickup surface by the optical system to an electric signal, and the optical system is the abovementioned single-focus optical system.

Moreover, another optical apparatus of the present invention comprises:

an optical system, and a display element which is disposed on a reduction side, wherein the display element has a display surface, and an image displayed on the display surface is projected on the enlargement side by the optical system, and the optical system is the abovementioned single-focus optical system.

DETAILED DESCRIPTION OF THE INVENTION

Figure 1A:
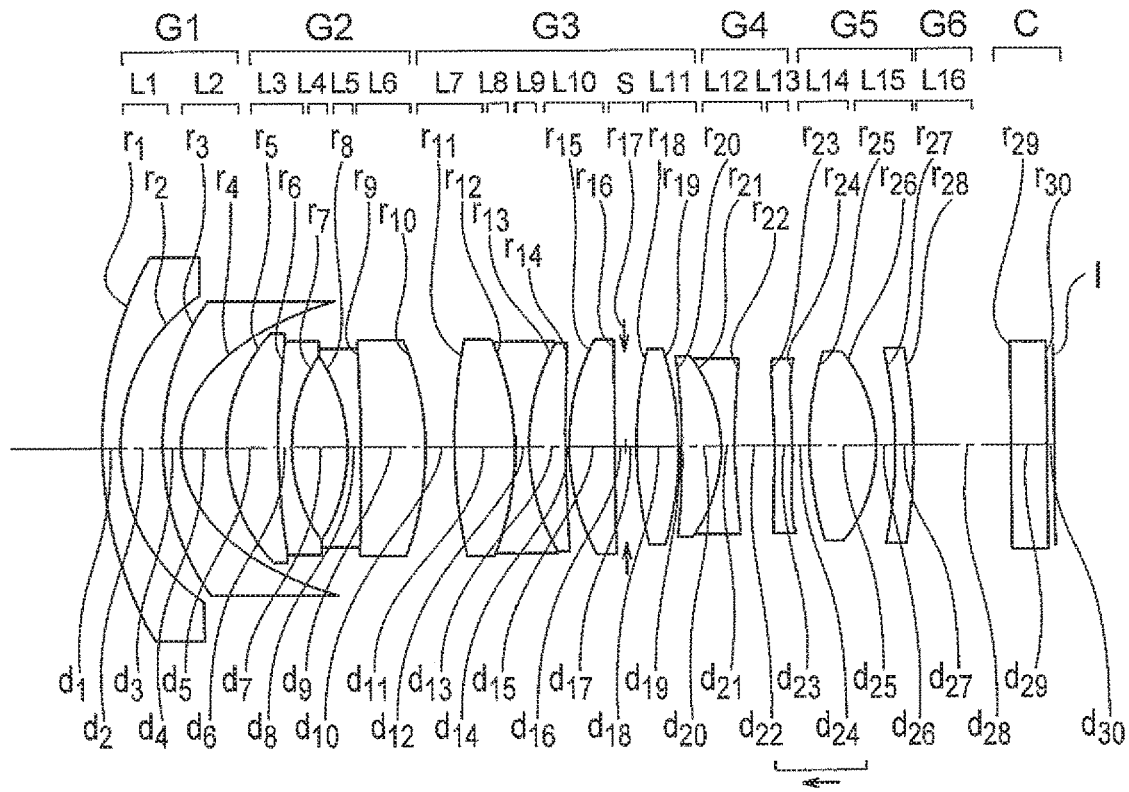
FIG. 1A, and FIG. 1B, FIG. 1C, FIG. 1D, and FIG. 1E are a cross-sectional view and aberration diagrams respectively, of a single-focus optical system according to an example 1.
Figures 1B, 1C, 1D, 1E:
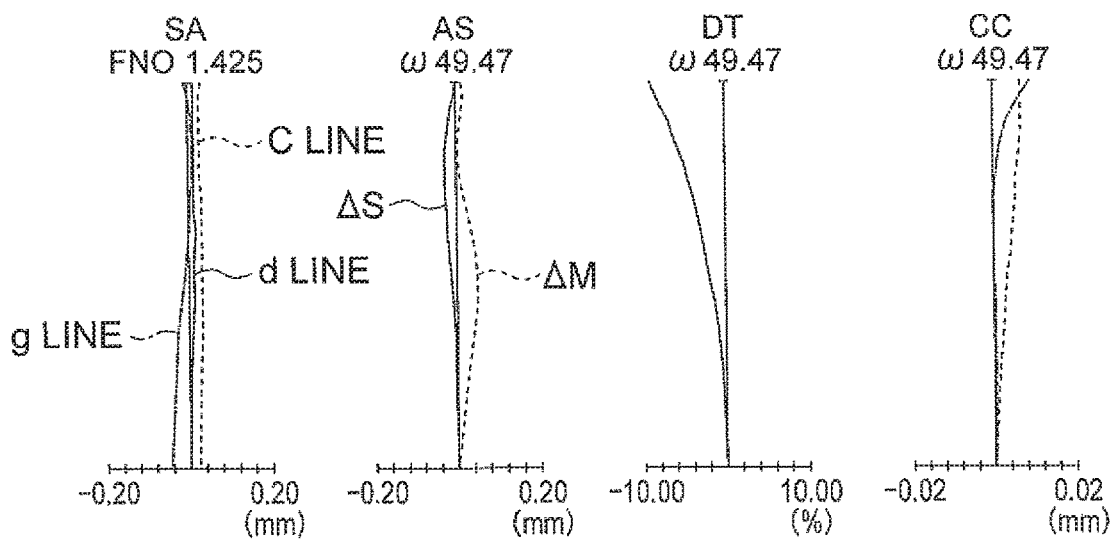
Figure 2A:
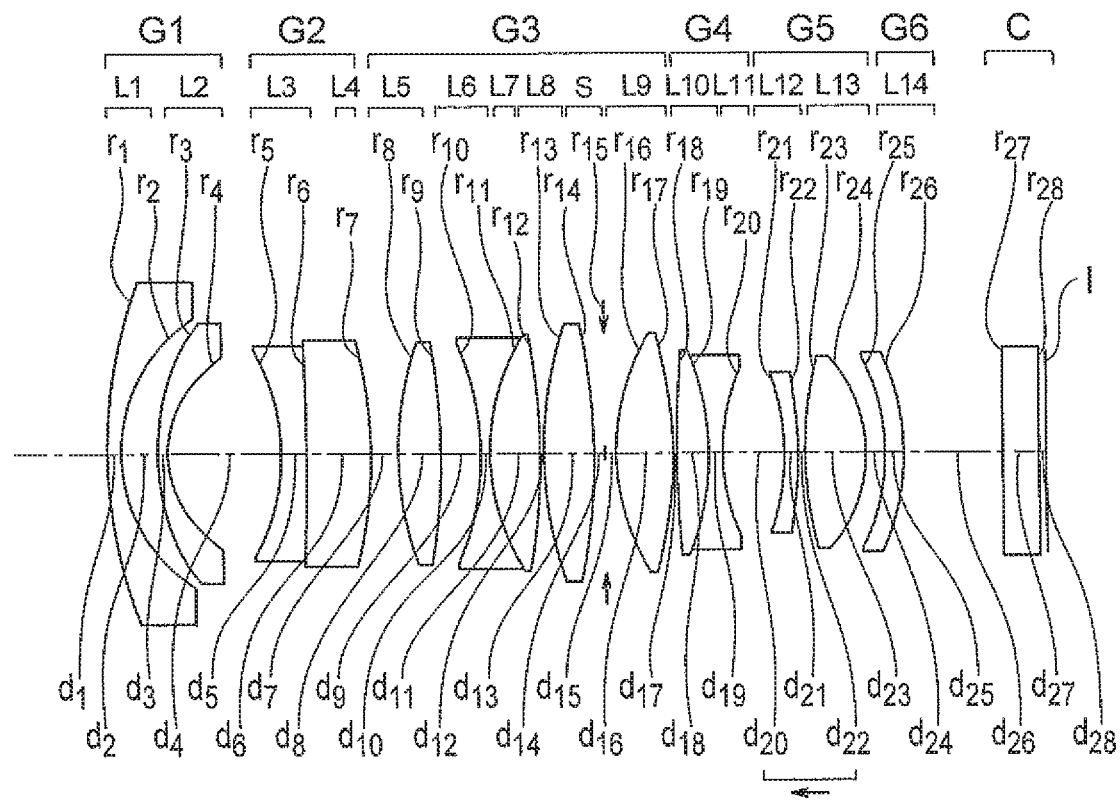
FIG. 2A, and FIG. 2B, FIG. 2C, FIG. 2D, and FIG. 2E are a cross-sectional view and aberration diagrams respectively, of a single-focus optical system according to an example 2.
Figures 2B, 2C, 2D, 2E:
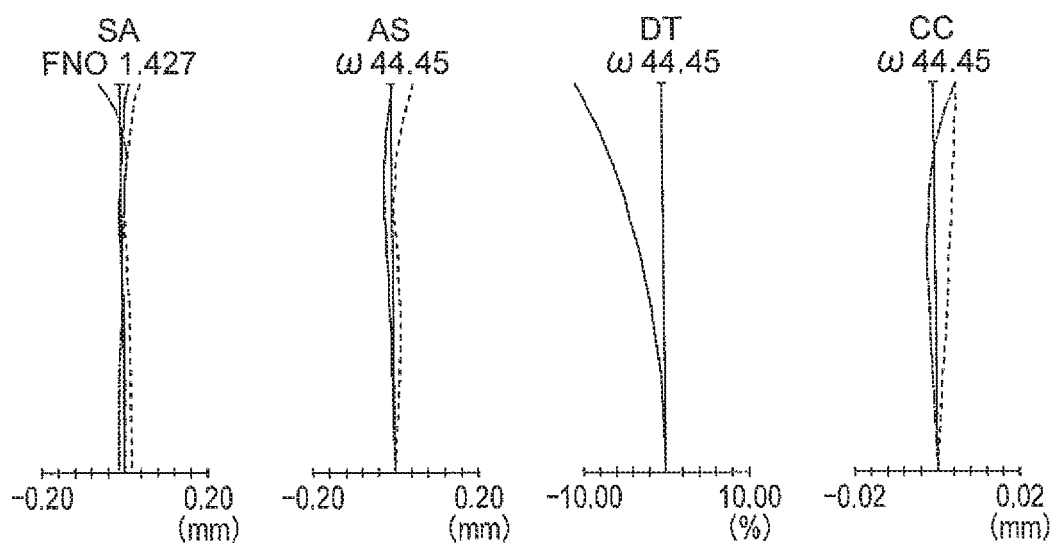
Figure 3A:
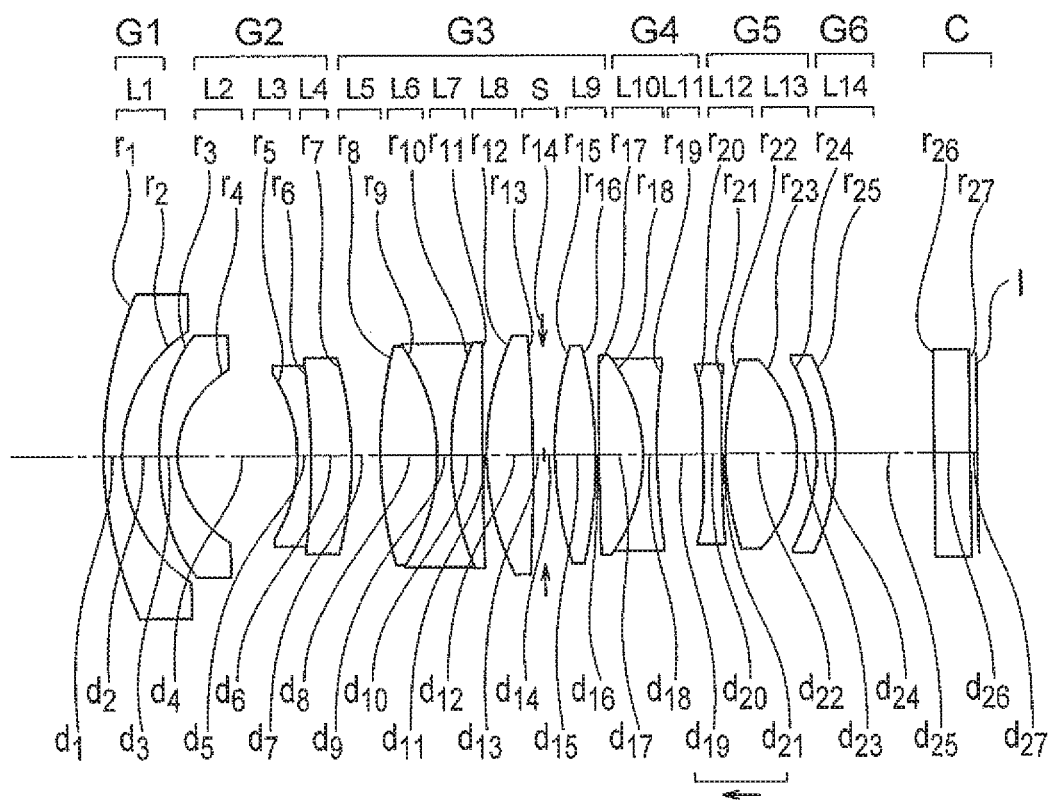
FIG. 3A, and FIG. 3B, FIG. 3C, FIG. 3D, and FIG. 3E are a cross-sectional view and aberration diagrams respectively, of a single-focus optical system according to an example 3.
Figures 3B, 3C, 3D, 3E:
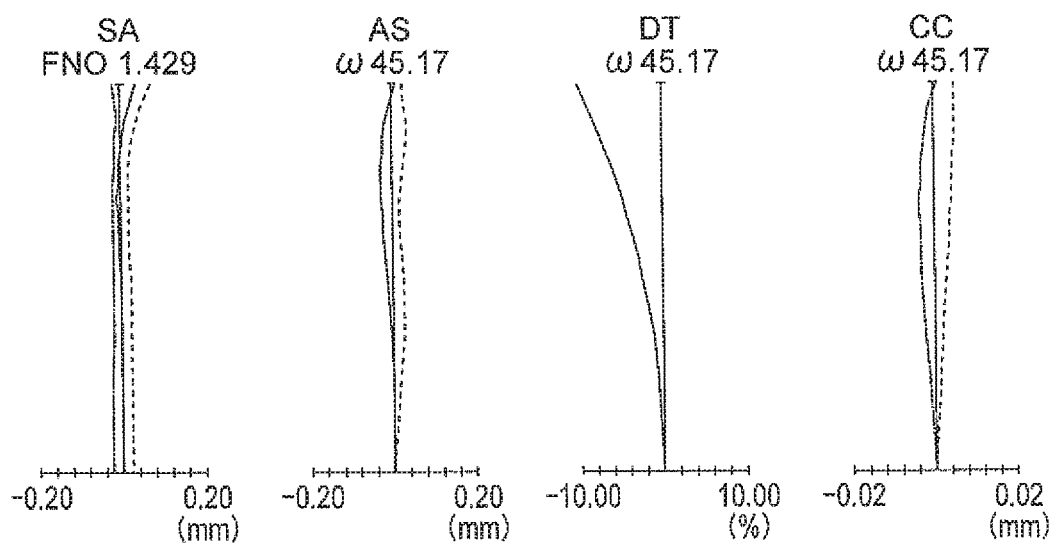
Figure 4A:
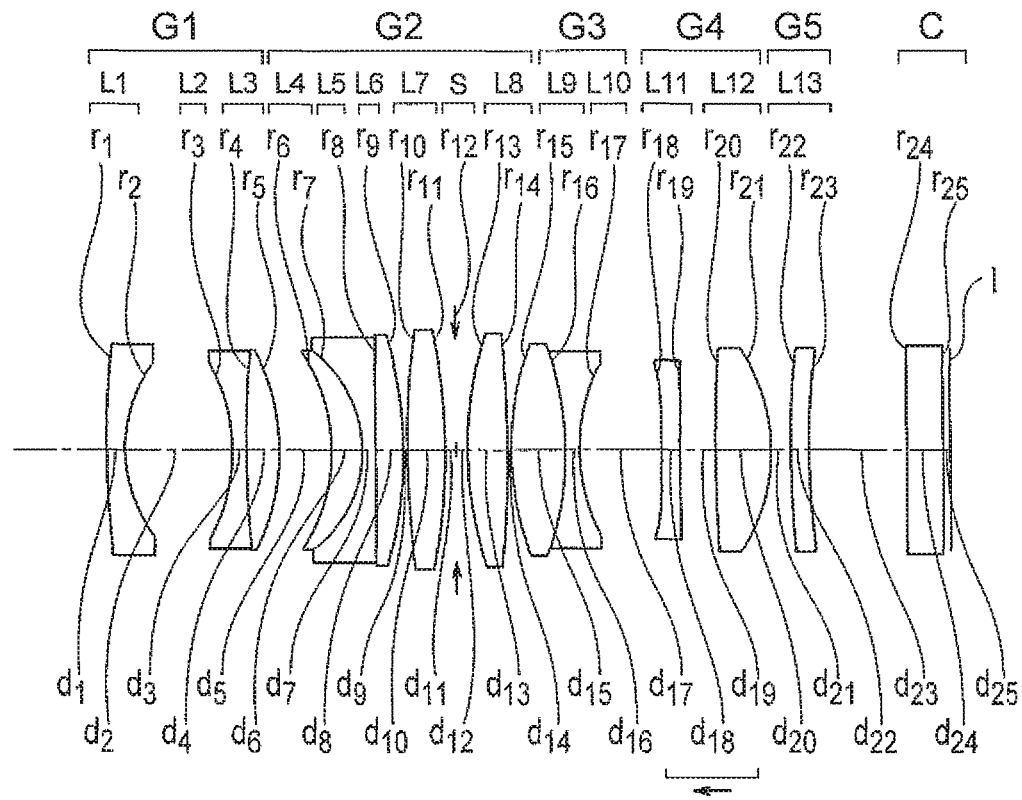
FIG. 4A, and FIG. 4B, FIG. 4C, FIG. 4D, and FIG. 4E are a cross-sectional view and aberration diagrams respectively, of a single-focus optical system according to an example 4.
Figures 4B, 4C, 4D, 4E:
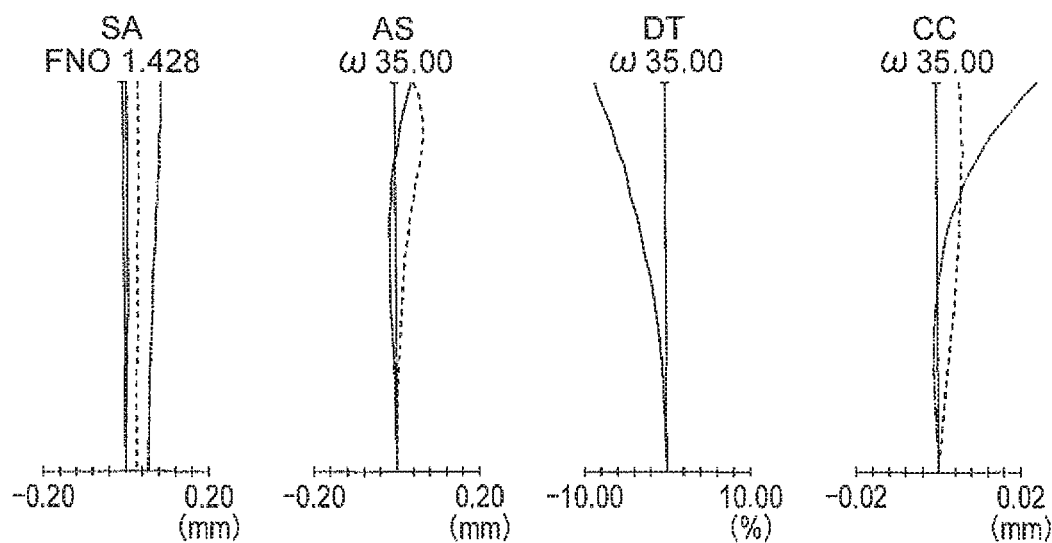

Embodiments and examples of a single-focus optical system and an optical apparatus using the same will be described below in detail by referring to the accompanying diagrams. However, the present invention is not restricted to the embodiments and the examples described below. The single-focus optical system means an optical system having a single focal length.

A single-focus optical system of a first embodiment is a single-focus optical system which forms a conjugate relationship between a conjugate point on an enlargement side where a distance is long and a conjugate point on a reduction side where a distance is short, and the single-focus optical system includes in order from the enlargement side, a front lens unit and a rear lens unit. The front lens unit either includes a predetermined sub lens unit, or includes in order from the enlargement side, an enlargement-side sub lens unit and the predetermined sub lens unit, and the rear lens unit includes in order from the enlargement side, a first sub lens unit, a second sub lens unit, a third sub lens unit, and a fourth sub lens unit. A lens component is one of a single lens and a cemented lens. The enlargement-side sub lens unit, in order from the enlargement side, either includes only one negative lens component or includes a plurality of negative lens components. The predetermined sub lens unit includes an enlargement-side meniscus lens component and a reduction-side meniscus lens component, and the enlargement-side meniscus lens component and the reduction-side meniscus lens components are disposed such that respective concave surfaces thereof are face-to-face. The first sub lens unit includes a plurality of positive lenses and a first predetermined negative lens, and in the first predetermined negative lens, a lens surface on the enlargement side is concave toward the enlargement side. One positive lens of the plurality of positive lenses is cemented to the reduction side of the first predetermined negative lens. The second sub lens unit includes a predetermined negative lens component, and in the predetermined negative lens component, a lens surface on the reduction side is concave toward the reduction side. The third sub lens unit includes a predetermined positive lens component which is positioned closest to the reduction side. The fourth sub lens unit includes all lens components that are positioned on the reduction side of the predetermined positive lens component.

The single-focus optical system of the first embodiment will be described below while comparing the single-focus optical system of the present embodiment with a Gaussian type optical system. In the following description, the enlargement side corresponds to an object side, and the reduction side corresponds to an image side.

As mentioned above, a Gaussian type optical system has a high imaging performance. Therefore, by deforming the Gaussian type optical system, it is possible to make the aperture ratio further larger, and to make the angle of view further wider. Therefore, in the single-focus optical system of the present embodiment, an optical system which is deformed the Gaussian type optical system to be able to cope with further wider angle of view, is used.

The single-focus optical system of the first embodiment is based on a Gaussian type optical system. In other words, various ideas have been devised while maintaining a basic arrangement of lenses and shapes of lenses (hereinafter, referred to as the 'basic arrangement') in a Gaussian type as far as possible. Therefore, the single-focus optical system of the first embodiment has a basic arrangement similar to that of the front unit, the intermediate unit, and the rear unit in the Gaussian type.

However, in the single-focus optical system of the first embodiment, an arrangement of refractive power is let to be different from an arrangement of refractive power in the Gaussian type by shifting a balance of arrangement of refractive power, while maintaining as far as possible, a basic arrangement in the front unit in the Gaussian type, a basic arrangement in the intermediate unit in the Gaussian type, and a basic arrangement in the rear unit in the Gaussian type.

More specifically, in the single-focus optical system, with respect to a portion corresponding to the front unit, the positive refractive power in the front unit is made to be shifted to a negative side. Moreover, in the single-focus optical system, with respect to a portion corresponding to the rear unit, the positive refractive power in the rear unit is made to be shifted substantially to a positive side. The shift of the refractive power to the negative side refers to changing the positive refractive power to a weak negative refractive power, and changing the positive refractive power to even weaker positive refractive power. The shift of the refractive power to the positive side refers to changing the positive refractive power to even stronger positive refractive power.

In such manner, in the single-focus optical system of the first embodiment, an arrangement of the optical system is rearranged to be advantageous for aberration correction while maintaining the basic arrangement in the Gaussian type as far as possible. In other words, the basic arrangement in the Gaussian type is rearranged to shift a refractive power of a portion corresponding to the front unit in the Gaussian type, to the negative side, and to shift substantially the refractive power of a portion corresponding to the rear unit in the Gaussian type to the positive side.

The single-focus optical system of the first embodiment includes in order from the enlargement side, the front lens unit and the rear lens unit. The front lens unit either includes the predetermined sub lens unit or includes in order from the enlargement side, the enlargement-side sub lens unit and the predetermined sub lens unit.

The enlargement-side sub lens unit corresponds to the front unit of the Gaussian type. The enlargement-side sub lens unit, in order from the enlargement side, either includes one negative lens component or includes the plurality of negative lens components.

It is preferable not to shift substantially the refractive power of the portion corresponding to the front unit to the negative side while a focal length of the overall single-focus optical system is long. In view of such circumstances, in that case, one positive lens component may be disposed immediately before the predetermined sub lens unit, or in other words, between the enlargement-side sub lens unit and the predetermined sub lens unit. By making such arrangement, it is possible to correct a spherical aberration and a longitudinal chromatic aberration favorably. However, disposing two or more positive lens components, by contrast, is not preferable, as the overall length of the optical system becomes long, and a diameter of the portion corresponding to the object-side unit becomes large.

On the other hand, in a case of shortening the focal length of the overall single-focus optical system, the positive lens component may not be disposed between the enlargement-side sub lens unit and the predetermined sub lens unit. By making such arrangement, it is possible to widen the angle of view.

The predetermined sub lens unit corresponds to the intermediate unit of the Gaussian type. The predetermined sub lens unit includes two meniscus lens components of which the concave surfaces are face-to-face. One of the meniscus lens components is disposed with the concave surface directed toward the reduction side and the other meniscus lens component is disposed with the concave surface directed toward the enlargement side.

The rear lens unit includes in order from the enlargement side, the first sub lens unit, the second sub lens unit, the third sub lens unit, and the fourth sub lens unit. The rear lens unit corresponds to the rear unit of the Gaussian type. In the rear unit of the Gaussian type, an aberration correction is susceptible to be difficult. By the rear lens unit including the plurality of sub lens units, it is possible to carry out the aberration correction favorably.

In an optical system with a large aperture ratio, particularly, the spherical aberration, a coma, and an astigmatism are strictly sought to be corrected favorably. Therefore, the plurality of positive lenses is disposed in the first sub lens unit. Since the predetermined sub lens unit is positioned immediately before the first sub lens unit, it is possible to carryout the aberration correction mutually by the plurality of positive lenses and the predetermined sub lens unit. As a result, it is possible to correct the spherical aberration, the coma, and the astigmatism in its entirety, in a balanced manner.

The first predetermined negative lens is disposed in the first sub lens unit. A height of an axial light ray is high on the reduction side of the first predetermined negative lens. Therefore, by cementing the positive lens to the reduction side of the first predetermined negative lens, the longitudinal chromatic aberration is corrected. Moreover, since the plurality of positive lenses and the first predetermined negative lens are disposed, it becomes easy to carry out the correction of a chromatic aberration of magnification in particular.

In such manner, in the single-focus optical system of the first embodiment, an arrangement in which, the refractive power of the portion corresponding to the front unit is shifted to the negative side and the refractive power of the portion corresponding to the rear unit is shifted substantially to the positive side, has been adopted. Consequently, from a viewpoint of refractive power, the single-focus optical system of the first embodiment differs from the Gaussian type optical system.

However, the single-focus optical system of the first embodiment also, has the basic arrangement of the Gaussian type. Accordingly, the single-focus optical system of the first embodiment can be said to be based on an optical system in which the potential for aberration correction is extremely high. Consequently, in the single-focus optical system of the first embodiment, it is possible to correct particularly, the spherical aberration, the coma, the longitudinal chromatic aberration, and the chromatic aberration of magnification extremely favorably.

As a result, it is possible to realize a single-focus optical system having an imaging performance superior to that of a conventional Gaussian type optical system. In other words, it is possible to realize a single-focus optical system in which various aberrations are corrected favorably, while having a wide angle of view and a small F-number. Here, for instance, the F-number not more than 1.5 is called as a small F-number. Moreover, the angle of view more than 50 degrees is called as a wide angle of view. However, the values of the F-number and the angle of view are not restricted to the abovementioned values.

In this way, according to the single-focus optical system of the first embodiment, it is possible to provide a single-focus optical system which has an F-number smaller than 1.5 in a category of lenses from a standard lens to a wide-angle lens, and has an extremely high potential for aberration correction. Particularly, regarding the imaging performance, it is possible to have imaging performance of a level far superior to that of a conventional single-focus optical system for a 35 mm film size.

A single-focus optical system of a second embodiment is a single-focus optical system which forms a conjugate relationship between a conjugate point on an enlargement side where a distance is long and a conjugate point on a reduction side where a distance is short, and the single-focus optical system includes in order from the enlargement side, a front lens unit and a rear lens unit. The front lens unit includes in order form the enlargement side, an enlargement-side sub lens unit and a predetermined sub lens unit, and the rear lens unit includes in order from the enlargement side, a first sub lens unit, a second sub lens unit, a third sub lens unit, and a fourth sub lens unit. A lens component is one of a single lens and a cemented lens. The enlargement-side sub lens unit, in order from the enlargement side, either includes only one negative lens component or includes a plurality of negative lens components. The predetermined sub lens unit includes an enlargement-side meniscus lens component and a reduction-side meniscus lens component, and the enlargement-side meniscus lens component and the reduction-side meniscus lens components are disposed such that respective concave surfaces thereof are face-to-face. The first sub lens unit includes a plurality of positive lenses and a first predetermined negative lens, and in the first predetermined negative lens, a lens surface on the enlargement side is concave toward the enlargement side. One positive lens of the plurality of positive lenses is cemented to the reduction side of the first predetermined negative lens. The second sub lens unit includes a predetermined negative lens component, and in the predetermined negative lens component, a lens surface on the reduction side is concave toward the reduction side. The third sub lens unit includes a predetermined positive lens component which is positioned closest to the reduction side. The fourth sub lens unit includes all lens components that are positioned on the reduction side of the predetermined lens component.

In the single-focus optical system of the first embodiment and the single-focus optical system of the second embodiment (hereinafter, referred to as 'the single-focus optical system of the present embodiment'), it is preferable that an air space between the enlargement-side sub lens unit and the second sub lens unit be constant.

In the single-focus optical system of the present embodiment, it is preferable that the first sub lens unit, as a whole, have a positive refractive power, and the second sub lens unit have a negative refractive power, and the third sub lens unit have a positive refractive power.

In the single-focus optical system of the present embodiment, it is preferable that at least one of the second sub lens unit and the third sub lens unit move along an optical axis at a time of focusing.

As a method for focusing to an object at a nearer distance, a method of drawing out a whole of a single-focus optical system toward an object side is available. However, an optical system with a large aperture ratio in general, is heavy in weight. Therefore, an inner focusing method is used as a method for focusing in many cases. In the inner focusing method, only some of the lens units of an optical system move on an optical axis at the time of focusing. Even in the single-focus optical system of the present embodiment, the inner focusing method has been used.

Incidentally, in an optical system with a large aperture ratio, particularly the spherical aberration, the coma, and the astigmatism are strictly sought to be corrected favorably. For aberration correction, a method of cancelling an aberration that has occurred in one lens unit or a plurality of lens units, in another lens unit is used. By doing so, it is possible to correct each aberration in a balanced manner. It is also possible to correct each of the spherical aberration, the coma, and the astigmatism in a balanced manner by using this method.

In the inner focusing method, some of the lens units move at the time of focusing. Therefore, when the inner focusing method is used in an optical system with a large aperture ratio, the balance of correction is disrupted particularly for the spherical aberration, the coma, and the astigmatism.

As mentioned above, even in the single-focus optical system of the present embodiment, the inner focusing method is adopted. Here, an aberration fluctuation when the lens unit is moved is small in the second sub lens unit and the third sub lens unit of the single-focus optical system of the present embodiment. Moreover, both the second sub lens unit and the third sub lens unit are light-weight. Therefore, in the single-focus optical system of the present embodiment, at the time of focusing, at least one of the second sub lens unit and the third sub lens unit is moved along an optical axis. By doing so, it is possible to maintain the correction of the spherical aberration, the coma, and the astigmatism in a balanced manner.

In the single-focus optical system of the present embodiment, it is preferable that the third lens unit either include only the predetermined positive lens component or includes in order from the enlargement side, one lens component and the predetermined positive lens component, and an absolute value of a refractive power of the one lens component is smaller than an absolute value of a refractive power of the predetermined positive lens component.

By making such arrangement, it is possible to correct the spherical aberration, the coma, and the astigmatism in a balanced manner.

In the single-focus optical system of the present embodiment, it is preferable that one positive lens of the plurality of positive lenses is cemented to the enlargement side of the first predetermined negative lens.

As mentioned above, the positive lens is cemented to the reduction side of the first predetermined negative lens. Accordingly, it is possible to correct the longitudinal chromatic aberration. Moreover, by cementing the positive lens also to the enlargement side of the first predetermined negative lens, it is possible to correct the longitudinal chromatic aberration more favorably. Furthermore, it is possible to suppress an occurrence of a chromatic aberration of higher order, an occurrence of a chromatic aberration of the spherical aberration and an occurrence of a chromatic coma.

In the single-focus optical system of the present embodiment, it is preferable that one positive lens of the plurality of positive lenses be disposed closest to the reduction side.

As mentioned above, in the single-focus optical system of the present embodiment, the refractive power of the lens unit corresponding to the rear unit of the Gaussian type is shifted substantially toward a positive side. The first sub lens unit corresponds to a part of the rear unit of the Gaussian type. Therefore, in the first sub lens unit, the positive refractive power becomes large.

By making the positive refractive power of the reduction side of the first sub unit large, it is possible to correct the spherical aberration and the coma favorably. Therefore, it is preferable to dispose a positive lens on the reduction side of the first sub lens unit. By making such arrangement, even when the aperture ratio is made large and the angle of view is made wide, it is possible to correct the spherical aberration and the coma favorably.

In the single-focus optical system of the present embodiment, it is preferable that the reduction-side meniscus lens component be a cemented lens which includes in order from the enlargement side, a negative lens and a positive lens.

By making such arrangement, it is possible to correct both of an axial aberration and an off-axis aberration favorably.

The predetermined sub lens unit corresponds to the intermediate unit in the Gaussian type. The predetermined sub lens unit is significant for the correction of the spherical aberration and at the same time, has a significant role in correction of a chromatic aberration. For such reason, it is preferable that the predetermined lens unit have basically an arrangement as that of the intermediate unit in the Gaussian type. Making such arrangement is preferable as it is possible to correct both the axial aberration and the off-axis aberration.

In the single-focus optical system of the present embodiment, it is preferable that lens components up to a second lens component counted from the closest reduction side include two lens surfaces that are convex toward the reduction side.

For an axial light beam in a light beam emerged from the single-focus optical system, it is preferable that in the lens components up to the second lens component counted from the closest reduction side, a lens surface is concave toward the reduction side. However, at these two lens components, a height of a light ray in an off-axis light beam is higher than a height in an axial light beam, and an angle of emergence is negative. Therefore, for the off-axis light beam, it is preferable that in the lens components up to the second lens component counted from the closest reduction side, a lens surface is concave toward the reduction side. Taking into consideration the balance of the overall aberration correction, it is preferable that the lens components up to the second lens component counted from the closest reduction side include not less than two lens surfaces that are convex toward the reduction side.

In the single-focus optical system of the present embodiment, it is preferable that the following conditional expression (1) be satisfied:

$$|0.53-\theta gF_{3N}|/(70-vd_{3N})<1.950\times10^{-3} \quad (1)$$

where, $\theta gF_{3N}$ denotes a partial dispersion ratio for the first predetermined negative lens, $vd_{3N}$ denotes Abbe number for the first predetermined negative lens, $$\theta gF_{3N}=(ng_{3N}-nF_{3N})/(nF_{3N}-nC_{3N})$$

$$vd_{3N}=(nd_{3N}-1)/(nF_{3N}-nC_{3N}),$$

and here $nd_{3N}$, $nF_{3N}$, $nC_{3N}$, and $ng_{3N}$ are a refractive index for a d-line, a refractive index for an F-line, a refractive index for a C-line, and a refractive index for a g-line respectively.

In an optical system with a small F-number, or in other words, in an optical system with a large aperture ratio, even when a focal length is short, a secondary spectrum longitudinal chromatic aberration causes a remarkable degradation of imaging performance. A lens in which a height of the axial light ray is relatively high with respect to an effective aperture, and has a large refractive power has a significant effect for the correction of the longitudinal chromatic aberration. The first predetermined negative lens corresponds to such lens.

For such reason, it is preferable to satisfy conditional expression (1). A left side of conditional expression (1) indicates a gradient of a line connecting (vd, $\theta gF$)=(70, 0.53) and (vd, $\theta gF$) of the first predetermined negative lens in a coordinate system in which a horizontal axis is let to be vd and a vertical axis is let to be $\theta gF$. It is preferable that the gradient be close to zero in particular.

In a case of not satisfying conditional expression (1), correction of the secondary spectrum becomes difficult.

It is more preferable that the following conditional expression (1') be satisfied instead of conditional expression (1).

$$|0.53-\theta gF_{3N}|/(70-vd_{3N})<1.857\times10^{-3} \quad (1')$$

It is even more preferable that the following conditional expression (1") be satisfied instead of conditional expression (1).

$$|0.53-\theta gF_{3N}|/(70-vd_{3N})<1.850\times10^{-3} \quad (1'')$$

In the single-focus optical system of the present embodiment, it is preferable that the following conditional expression (2) be satisfied:

$$|\theta gF_{3P}-0.6|/(vd_{3P}-30)<2.000\times10^{-3} \quad (2)$$

where, $\theta gF_{3P}$ denotes a partial dispersion ratio for the predetermined positive lens, $vd_{3P}$ denotes Abbe number for the predetermined positive lens, $$\theta gF_{3P}=(ng_{3P}-nF_{3P})/(nF_{3P}-nC_{3P})$$

$$vd_{3P}=(nd_{3P}-1)/(nF_{3P}-nC_{3P}),$$

and here $nd_{3P}$, $nF_{3P}$, $nC_{3P}$, and $ng_{3P}$ are a refractive index for a d-line, a refractive index for an F-line, a refractive index for a C-line, and a refractive index for a g-line respectively, and the predetermined positive lens is at least one positive lens positioned on the reduction side of the first predetermined negative lens, out of the plurality of positive lenses.

As mentioned above, in an optical system with a small F-number, or in other words, in an optical system with a large aperture ratio, even when a focal length is short, the longitudinal chromatic aberration, and the secondary spectrum in particular, cause a remarkable degradation of imaging performance. A lens in which the height of the axial light ray is relatively high with respect to an effective aperture, and has a large refractive power has a significant effect for the correction of the longitudinal chromatic aberration. A positive lens positioned on the reduction side of the first predetermined negative lens corresponds to such lens. The positive lens which is cemented to the reduction side of the first predetermined negative lens also corresponds to such lens.

For such reason, it is preferable to satisfy conditional expression (2). A left side of conditional expression (2) indicates a gradient of a line connecting (vd, $\theta gF$)=(30, 0.6) and (vd, $\theta gF$) of the positive lens in a coordinate system in which a horizontal axis is let to be νd and a vertical axis is let to be θgF. It is preferable that the gradient be close to zero in particular.

In a case of not satisfying conditional expression (2), correction of the secondary spectrum becomes difficult.

It is preferable that two of the positive lenses positioned on the reduction side of the first predetermined negative lens satisfy conditional expression (2). When three positive lenses satisfy conditional expression (2), it is more favorable.

It is more preferable that the following conditional expression (2') be satisfied instead of conditional expression (2).

$$|\theta gF_{3P}-0.6|/(\nu d_{3P}-30)<1.250\times10^{-3} \quad (2')$$

It is even more preferable that the following conditional expression (2") be satisfied instead of conditional expression (2).

$$|\theta gF_{3P}-0.6|/(\nu d_{3P}-30)<-2.000\times10^{-3} \quad (2'')$$

In the single-focus optical system of the present embodiment, it is preferable that an absolute value of a refractive power of the first predetermined negative lens be larger than an absolute value of a refractive power of each positive lens of the plurality of positive lenses.

As mentioned above, even when an optical system is with a small F-number and a short focal length, the first predetermined negative lens has a significant effect for the longitudinal chromatic aberration. Therefore, for the first predetermined negative lens, it is desirable to make both a value of νd and a value of θgF as small as possible.

Although it is significant to make small the value of θgF in particular, such high-dispersion material hardly exists in reality. In such situation, when an attempt is made to correct the secondary spectrum favorably, an achromatism is susceptible to be inadequate for a first-order chromatic aberration, or in other words, for two wavelengths of the C-line and the F-line.

Therefore, the refractive power of the first predetermined negative lens is made larger than the refractive power of each positive lens in the first sub lens unit. By making such arrangement, it is possible to correct both the first-order chromatic aberration and the secondary spectrum favorably. The refractive power of the first predetermined negative lens is an absolute value of the refractive power in a state of both surfaces thereof in contact with air.

In the single-focus optical system of the present embodiment, it is preferable that the predetermined negative lens component be a cemented lens which includes a positive lens disposed on the enlargement side and a negative lens disposed on the reduction side, and an aperture stop is disposed between the first predetermined negative lens and the predetermined negative lens component.

By making such arrangement, near the aperture stop, an arrangement of a positive refractive power and a negative refractive power of a lens is approximately symmetrical. Therefore, correction of an off-axis chromatic aberration, and particularly, correction of the longitudinal chromatic aberration and correction of the chromatic coma become favorable.

In the single-focus optical system of the present embodiment, it is preferable that the enlargement-side subunit include an enlargement-side negative lens component, and the enlargement-side negative lens component is a negative lens component having a meniscus shape positioned closest to the enlargement side of the enlargement-side sub lens unit.

In a case in which the aperture stop is disposed on the reduction side of the predetermined sub lens unit, the enlargement-side negative lens component is farther away from the aperture stop as compared to the reduction-side meniscus lens component. Consequently, a height of a light ray of an off-axis light beam becomes higher as compared to that at the reduction-side meniscus lens component.

Therefore, it is preferable to let the shape of the enlargement-side negative lens component to be a meniscus shape. By making such arrangement, it is possible to make the aperture ratio large as well as to make the angle of view wide. In the enlargement-side negative lens component, it is preferable that a lens surface on the reduction side be concave toward the reduction side.

In the single-focus optical system of the present embodiment, it is preferable that the following conditional expression (3) be satisfied:

$$0.65<(R_{11F}+R_{11R})/(R_{11F}-R_{11R})<4.0 \quad (3)$$

where, $R_{11F}$ denotes a paraxial radius of curvature of a lens surface positioned closest to the enlargement side of the enlargement-side negative lens component, and $R_{11R}$ denotes a paraxial radius of curvature of a lens surface positioned closest to the reduction side of the enlargement-side negative lens component.

In a case of falling below a lower limit value of conditional expression (3), correction of a barrel distortion becomes difficult. In a case of exceeding an upper limit value of conditional expression (3), correction of the astigmatism in particular, becomes difficult.

It is more preferable that the following conditional expression (3') be satisfied instead of conditional expression (3).

$$0.85<(R_{11F}+R_{11R})/(R_{11F}-R_{11R})<3.5 \quad (3')$$

It is even more preferable that the following conditional expression (3") be satisfied instead of conditional expression (3).

$$1.05<(R_{11F}+R_{11R})/(R_{11F}-R_{11R})<3.0 \quad (3'')$$

In the single-focus optical system of the present embodiment, it is preferable that the following conditional expression (4) be satisfied:

$$-1.2<(R_{3NF}+R_{3NR})/(R_{3NF}-R_{3NR})<1.0 \quad (4)$$

where, $R_{3NF}$ denotes a paraxial radius of curvature of an enlargement-side lens surface of the first predetermined negative lens, and $R_{3NR}$ denotes a paraxial radius of curvature of a reduction-side lens surface of the first predetermined negative lens.

A divergent light beam is incident from the enlargement side of the first predetermined negative lens. In such state, in a case of making the aperture ratio large, taking into consideration the correction of the spherical aberration and the correction of the coma, it is preferable that a shape of the first predetermined negative lens be a shape such that an angle of incidence of the divergent light beam becomes small.

Either in a case of falling below a lower limit value of conditional expression (4) or in a case of exceeding an upper limit value of conditional expression (4), correction of the spherical aberration and the coma becomes difficult.

It is more preferable that the following conditional expression (4') be satisfied instead of conditional expression (4).

$$-1.2<(R_{3NF}+R_{3NR})/(R_{3NF}-R_{3NR})<0.5 \qquad (4')$$

It is even more preferable that the following conditional expression (4") be satisfied instead of conditional expression (4).

$$-0.5<(R_{3NF}+R_{3NR})/(R_{3NF}-R_{3NR})<0.5 \qquad (4'')$$

In the single-focus optical system of the present embodiment, it is preferable that the following conditional expression (5) be satisfied:

$$0.50<(R_{21F}+R_{21R})/(R_{21F}-R_{21R})<100 \qquad (5)$$

where, $R_{21F}$ denotes a paraxial radius of curvature of a lens surface positioned closest to the enlargement side of the enlargement-side meniscus lens component, and $R_{21R}$ denotes a paraxial radius of curvature of a lens surface positioned closest to the reduction side of the enlargement-side meniscus lens component.

Either in a case of falling below a lower limit value of conditional expression (5) or in a case of exceeding an upper limit value of conditional expression (5), when the aperture ratio is made large as well as the angle of view is made wide, it becomes difficult to correct the spherical aberration and the coma in a balanced manner.

It is more preferable that the following conditional expression (5') be satisfied instead of conditional expression (5).

$$0.80<(R_{21F}+R_{21R})/(R_{21F}-R_{21R})<100 \qquad (5')$$

It is even more preferable that the following conditional expression (5") be satisfied instead of conditional expression (5).

$$1.00<(R_{21F}+R_{21R})/(R_{21F}-R_{21R})<100 \qquad (5'')$$

In the single-focus optical system of the present embodiment, it is preferable that the following conditional expression (6) be satisfied:

$$-0.8<(R_{21R}+R_{22F})/(R_{21R}-R_{22F})<0.5 \qquad (6)$$

where, $R_{21R}$ denotes a paraxial radius of curvature of a lens surface positioned closest to the reduction side of the enlargement-side meniscus lens component, and $R_{22F}$ denotes a paraxial radius of curvature of a lens surface positioned closest to the enlargement side of the reduction-side meniscus lens component.

A space filled with air is formed between a lens surface positioned closest to the reduction side of the enlargement-side meniscus lens component and a lens surface positioned closest to the enlargement side of the reduction-side meniscus lens component. Surfaces on both sides of this space have a strong diverging effect. When the aperture stop is positioned in the rear unit, an off-axis light beam is incident on this space, aimed at a center of the aperture stop. At this time, the off-axis light becomes a divergent light beam.

Therefore, when correcting two sets of aberrations in a balanced manner is taken into consideration, it is preferable that a shape of the space be a biconvex shape, or in other words, a value of $(R_{21R}+R_{22F})/(R_{21R}-R_{22F})$ is close to zero. Aberrations in one set of aberrations are the spherical aberration and the coma, and aberrations in the other set of aberrations are the astigmatism, the distortion, and the chromatic aberration of magnification.

Either in a case of falling below a lower limit value of conditional expression (6) or in a case of exceeding an upper limit value of conditional expression (6), it becomes difficult to correct the two sets of aberrations in a balanced manner. Not satisfying conditional expression (6) is not preferable for making the aperture ratio large and making the angle of view wide.

It is more preferable that the following conditional expression (6') be satisfied instead of conditional expression (6).

$$-0.6<(R_{21R}+R_{22F})/(R_{21R}-R_{22F})<0.3 \qquad (6')$$

It is even more preferable that the following conditional expression (6") be satisfied instead of conditional expression (6).

$$-0.4<(R_{21R}+R_{22F})/(R_{21R}-R_{22F})<0.1 \qquad (6'')$$

In the single-focus optical system of the present embodiment, it is preferable that the following conditional expression (7) be satisfied:

$$-100<(R_{22F}+R_{22R})/(R_{22F}-R_{22R})<-1.00 \qquad (7)$$

where, $R_{22F}$ denotes a paraxial radius of curvature of a lens surface positioned closest to the enlargement side of the reduction-side meniscus lens component, and $R_{22R}$ denotes a paraxial radius of curvature of a lens surface position closest to the reduction side of the reduction-side meniscus lens component.

Either in a case of falling below a lower limit value of conditional expression (7) or in a case of exceeding an upper limit value of conditional expression (7), when the aperture ratio is made large as well as the angle of view is made wide, it becomes difficult to correct the spherical aberration and the coma in a balanced manner.

It is more preferable that the following conditional expression (7') be satisfied instead of conditional expression (7).

$$-100<(R_{22F}+R_{22R})/(R_{22F}-R_{22R})<-1.50 \qquad (7')$$

It is even more preferable that the following conditional expression (7") be satisfied instead of conditional expression (7).

$$-100<(R_{22F}+R_{22R})/(R_{22F}-R_{22R})<-2.00 \qquad (7'')$$

In the single-focus optical system of the present embodiment, it is preferable that the following conditional expression (8) be satisfied:

$$-1.0<SF_{3F}-SF_{3R}<10.0 \qquad (8)$$

where, $$SF_{3F}=(R_{3FF}+R_{3FR})/(R_{3FF}-R_{3FR}),$$

$$SF_{3R}=(R_{3RF}+R_{3RR})/(R_{3RF}-R_{3RR}),$$

and here $R_{3FF}$ denotes a paraxial radius of curvature of an enlargement-side lens surface of an enlargement-side positive lens, $R_{3FR}$ denotes a paraxial radius of curvature of a reduction-side lens surface of the enlargement-side positive lens, $R_{3RF}$ denotes a paraxial radius of curvature of an enlargement-side lens surface of a reduction-side positive lens, and $R_{3RR}$ denotes a paraxial radius of curvature of a reduction-side lens surface of the reduction-side positive lens, and here the enlargement-side positive lens is a positive lens which is positioned closest to the enlargement side, of the plurality of positive lenses, and the reduction-side positive lens is a positive lens which is positioned closest to the reduction side, of the plurality of positive lenses.

In the first sub lens unit, the height of an axial light ray is the maximum at a position at which the plurality of positive lenses is disposed. Therefore, the shape of each positive lens of the plurality of positive lenses has a close relationship with the correction of the spherical aberration which has an effect on a sharpness of an overall image.

Moreover, this axial light beam is in a diverged state on the enlargement side of the first sub lens unit. In the first sub lens unit, for turning the diverged state to a converged state, it is preferable to arrange each positive lens such that a shaping factor for each positive lens is toward a negative side from the enlargement side to the reduction side. Moreover, it is necessary that a difference in the shaping factor of the positive lenses that are positioned at two ends assumes a certain appropriate value.

Either in case of falling below a lower limit value of conditional expression (8) or in a case of exceeding an upper limit value of conditional expression (8), it becomes difficult to correct the spherical aberration when the aperture ratio is made large and the angle of view is made wide.

It is more preferable that the following conditional expression (8') be satisfied instead of conditional expression (8).

$$-0.6 < SF_{3F} - SF_{3R} < 7.0 \tag{8'}$$

It is even more preferable that the following conditional expression (8″) be satisfied instead of conditional expression (8).

$$-0.2 < SF_{3F} - SF_{3R} < 4.0 \tag{8″}$$

In the single-focus optical system of the present embodiment, it is preferable that the following conditional expression (9) be satisfied:

$$-1.0 < (R_{41F} + R_{41R})/(R_{41F} - R_{41R}) < 10.0 \tag{9}$$

where, $R_{41F}$ denotes a paraxial radius of curvature of a lens surface positioned closest to the enlargement side of the predetermined negative lens component, and $R_{41R}$ denotes a paraxial radius of curvature of a lens surface positioned closest to the reduction side of the predetermined negative lens component.

In a case of using the inner focusing, the aberration fluctuation becomes problematical. In the inner focusing, when the predetermined negative lens component is let to be a lens component that is to be moved on the optical axis, it is possible to minimize the aberration fluctuation. In this case, although it is possible to carry out a stable focusing, when conditional expression (9) is not satisfied, it is not possible to suppress the aberration fluctuation adequately.

In a case of falling below a lower limit value of conditional expression (9), the fluctuation in the spherical aberration is susceptible to become large. In a case of exceeding an upper limit value of conditional expression (9), the fluctuation in the astigmatism is susceptible to become large.

It is more preferable that the following conditional expression (9') be satisfied instead of conditional expression (9).

$$-0.40 < (R_{41F} + R_{41R})/(R_{41F} - R_{41R}) < 5.0 \tag{9'}$$

It is even more preferable that the following conditional expression (9″) be satisfied instead of conditional expression (9).

$$-0.20 < (R_{41F} + R_{41R})/(R_{41F} - R_{41R}) < 2.5 \tag{9″}$$

In the single-focus optical system of the present embodiment, it is preferable that the following conditional expression (10) be satisfied:

$$-1.0 < (R_{51F} + R_{51R})/(R_{51F} - R_{51R}) < 2.0 \tag{10}$$

where, $R_{51F}$ denotes a paraxial radius of curvature of a lens surface positioned closest to the enlargement side of the predetermined positive lens component, and $R_{51R}$ denotes a paraxial radius of curvature of a lens surface positioned closest to the reduction side of the predetermined positive lens component.

For making an optical system small-sized and light-weight, it is preferable to reduce the number of lens components in the optical system. However, as the number of lens components is reduced gradually, in a case in which only the predetermined negative lens component is moved for the inner focusing, even when the abovementioned conditional expression (9) is satisfied, sometimes the aberration fluctuation is not suppressed adequately. In such case, it is preferable to move the predetermined positive lens component while changing a relative distance from the predetermined negative lens component. Moreover, in that case, it is preferable that conditional expression (10) be satisfied even for the shape.

In a case of falling below a lower limit value of conditional expression (10), the fluctuation in the astigmatism is susceptible to become large. In a case of exceeding an upper limit value of conditional expression (10), the fluctuation in the spherical aberration is susceptible to become large. The focusing may be carried out by fixing the predetermined negative lens component and moving only the predetermined positive lens component.

It is more preferable that the following conditional expression (10') be satisfied instead of conditional expression (10).

$$-0.3 < (R_{51F} + R_{51R})/(R_{51F} - R_{51R}) < 1.4 \tag{10'}$$

It is even more preferable that the following conditional expression (10″) be satisfied instead of conditional expression (10).

$$0.0 < (R_{51F} + R_{51R})/(R_{51F} - R_{51R}) < 1.0 \tag{10″}$$

In the single-focus optical system of the present embodiment, it is preferable that in an orthogonal coordinate system in which a horizontal axis is let to be $Nd_{3PR}$ and a vertical axis is let to be $vd_{3PR}$, when a straight line indicated by $Nd_{3PR} = \alpha \times vd_{3PR} + \beta_{3PR}$, where $\alpha = -0.01$, is set, $Nd_{3PR}$ and $vd_{3PR}$ of a reduction-side positive lens be included in both of an area determined by a straight line when a lower limit value $\beta_{3PR}$ of a range of the following conditional expression (11) is $\beta_{3PR} = 2.25$ and an area determined by the following conditional expressions (12) and (13):

$$2.25 \leq \beta_{3PR} \tag{11}$$

$$1.40 < Nd_{3PR} \tag{12}$$

$$35 < vd_{3PR} \tag{13}$$

where, $Nd_{3PR}$ denotes a refractive index of the reduction-side positive lens for a d-line, $vd_{3PR}$ denotes Abbe number for the reduction-side positive lens, and the reduction-side positive lens is a positive lens positioned closest to the reduction side, of the plurality of positive lenses.

In the sub first lens unit, at positions where the plurality of positive lens components is disposed, the height of the axial light ray is high. Consequently, in the plurality of positive lens components, particularly the chromatic aberration such as the longitudinal chromatic aberration and the spherical aberration of the spherical aberration is susceptible to occur.

The reduction-side positive lens is disposed closest to the reduction side in the first sub lens unit. This position is a position which is farthest away from the cemented lens in the first sub lens unit.

For small-sizing and light-weighting of the first sub lens unit, it is preferable to include a single lens in the reduction-side positive lens. However, at the position where the reduction-side positive lens is disposed, the chromatic aberration is susceptible to occur as mentioned above. Therefore, in a case of including a single lens in the reduction-side positive lens, an arrangement is to be made such that the refractive index and Abbe number for the reduction-side positive lens is included in the area determined by conditional expressions (11), (12), and (13). By making such arrangement, it is possible to suppress an occurrence of the longitudinal chromatic aberration and an occurrence of the spherical aberration of the spherical aberration.

In the single-focus optical system of the present embodiment, it is preferable that the predetermined negative lens component include a second predetermined negative lens, and in an orthogonal coordinate system in which a horizontal axis is let to be $Nd_{4NF}$ and a vertical axis is let to be $vd_{4NF}$, when a straight line indicated by $Nd_{4NF}=\alpha \times vd_{4NF}+\beta_{4NF}$, where $\alpha=-0.01$, is set, $Nd_{4NF}$ and $vd_{4NF}$ of the predetermined negative lens be included in both of an area determined by a straight line when a lower limit value $\beta_{4NF}$ of a range of the following conditional expression (14) is $\beta_{4NF}=1.95$, and an area determined by the following conditional expressions (15) and (16).

$$1.95 \leq \beta_{4NF} \quad (14)$$

$$1.60 < Nd_{4NF} \quad (15)$$

$$23 < vd_{4NF} \quad (16)$$

where, $Nd_{4NF}$ denotes a refractive index of the second predetermined negative lens for a d-line, and $vd_{4NF}$ denotes Abbe number for the second predetermined negative lens.

In a case in which the predetermined negative lens component moves at the time of focusing, it is desirable that the fluctuation in the chromatic aberration is small. An arrangement is to be made such that the predetermined negative lens component includes the second predetermined negative lens, and the refractive index and Abbe number for the second predetermined negative lens are included in areas determined by conditional expressions (14), (15), and (16). By making such arrangement, it is possible to suppress an occurrence of the longitudinal chromatic aberration, the chromatic aberration of magnification, the chromatic aberration of the spherical aberration, or the chromatic coma.

Moreover, in the single-focus optical system of the present embodiment, it is preferable that the enlargement-side sub lens unit include an enlargement-side negative lens component closest to the enlargement side, and the following conditional expression (A) be satisfied:

$$0 < f/e_{N1F} < 2 \quad (A)$$

where, f denotes the focal length of the overall single-focus optical system at the time of focusing to an object at infinity, and $e_{N1F}$ denotes a maximum effective aperture of the enlargement-side negative lens component in the first lens unit.

In a case of exceeding an upper limit value of conditional expression (A), it becomes difficult to widen the angle of view. In other words, when an attempt is made to widen the angle of view, the spherical aberration, the distortion, and the astigmatism are susceptible to occur. On the other hand, in a case of falling below a lower limit value of conditional expression (A), the optical system is susceptible to become large-sized in a radial direction.

Here, it is preferable that the following conditional expression (A') be satisfied instead of conditional expression (A).

$$0.1 < f/e_{N1F} < 1.5 \quad (A')$$

Moreover, it is even more preferable that the following conditional expression (A") be satisfied instead of conditional expression (A).

$$0.2 < f/e_{N1F} < 1 \quad (A")$$

Moreover, it is preferable that the single-focus optical system of the present embodiment include an aperture stop, and the following conditional expression (B) be satisfied:

$$0 < (f/e_{AS})/Fno < 2 \quad (B)$$

where, f denotes the focal length of the overall single-focus optical system at the time of focusing to an object at infinity, $e_{AS}$ denotes a maximum diameter of the aperture stop, and Fno denotes an F-number for the overall single-focus optical system at the time of focusing to an object at infinity.

In a case of exceeding upper limit value of conditional expression (B), it becomes difficult to widen the angle of view. In other words, when an attempt is made to widen the angle of view, correction of the spherical aberration and the chromatic aberration becomes difficult. Whereas, in a case of falling below a lower limit value of conditional expression (B), the optical system is susceptible to become large-sized in the radial direction.

Here, it is more preferable that the following conditional expression (B') be satisfied instead of conditional expression (B).

$$0.1 < (f/e_{AS})/Fno < 1 \quad (B')$$

Moreover, it is more preferable that the following conditional expression (B") be satisfied instead of conditional expression (B).

$$0.2 < (f/e_{AS})/Fno < 0.6 \quad (B")$$

Moreover, in the single-focus optical system of the present embodiment, it is preferable that the following conditional expression (C) be satisfied:

$$0 < T_{air\_max}/\Sigma d \leq 0.27 \quad (C)$$

where, $T_{air\_max}$ is a largest axial air space in the range from a surface positioned closest to the enlargement side to a surface positioned closest to the reduction side in the single-focus optical system, and $\Sigma d$ is an axial distance from the surface positioned closest to the enlargement side to the surface positioned closest to the reduction side in the single-focus optical system.

Conditional expression (C) is a conditional expression which is advantageous for securing a high optical performance, shortening the overall length of the optical system, and making small an outer diameter of the image forming optical system.

Widening appropriately an air space between the lenses leads to an improvement in an optical performance. However, securing an optical performance by widening excessively the air space between the lenses with respect to Σd, that is, the axial distance from the lens surface positioned closest to the enlargement side up to a lens surface positioned closest to the reduction side of the single-focus optical system, may lead to an increase in the overall length of the optical system and making an aperture of the optical system large.

Therefore, satisfying conditional expression (C) is advantageous for securing the number of lenses necessary for realizing a high optical performance while shortening the overall length of the optical system, and making the aperture small.

Here, it is more preferable that the following conditional expression (C') be satisfied instead of conditional expression (C).

$$0.03 < T_{air\_max}/\Sigma d \leq 0.24 \qquad (C')$$

Moreover, it is even more preferable that the following conditional expression (C") be satisfied instead of conditional expression (C).

$$0.05 < T_{air\_max}/\Sigma d \leq 0.20 \qquad (C'')$$

Providing the largest axial air space in the second sub unit is advantageous for correcting an off-axis aberration such as the coma in particular.

Moreover, an optical apparatus of the present embodiment includes an optical system and an image pickup element which is disposed on a reduction side. The image pickup element has an image pickup surface, and converts an image formed on the image pickup surface by the optical system to an electric signal, and the optical system is the abovementioned single-focus optical system.

According to the optical apparatus of the present embodiment, it is possible to pick up an image with a wide photographing range, a low noise, and a high resolution.

An optical apparatus of the present embodiment includes an optical system, and a display element which is disposed on the reduction side. The display element has a display surface, and an image displayed on the display surface is projected on the enlargement side by the optical system, and the optical system is the abovementioned single-focus optical system.

According to the optical apparatus of the present embodiment, it is possible to project an image with a wide projection range, a low noise, and a high resolution.

The abovementioned single-focus optical system and the optical apparatus may satisfy a plurality of arrangements simultaneously. Making such arrangement is preferable for achieving a favorable single-focus optical system and optical apparatus. Moreover, combinations of preferable arrangements are arbitrary. For each conditional expression, only the upper limit value or the lower limit value of a numerical range of a conditional expression further restricted, may be limited.

Examples of the single-focus optical system will be described below in detail by referring to the accompanying diagrams. However, the present invention is not restricted to the examples described below.

Examples 1 to 4 of the single-focus optical system will be described below by referring to the accompanying diagrams. Each of single-focus optical systems in examples 1 to 4 is a single-focus optical system with an F-number less than 1.5.

FIG. 1A, FIG. 2A, FIG. 3A, and FIG. 4A show lens cross-sectional views for the single-focus optical systems of the examples. The lens cross-sectional views are lens cross-sectional views at the time of focusing to an object at infinity.

FIG. 1B, FIG. 2B, FIG. 3B, and FIG. 4B show a spherical aberration (SA) in the single-focus optical systems of the examples.

FIG. 1C, FIG. 2C, FIG. 3C, and FIG. 4C show an astigmatism (AS) in the single-focus optical systems of the examples.

FIG. 1D, FIG. 2D, FIG. 3D, and FIG. 4D show a distortion (DT) in the single-focus optical systems of the examples.

FIG. 1E, FIG. 2E, FIG. 3E, and FIG. 4E show a chromatic aberration of magnification in the single-focus optical systems of the examples.

Each aberration diagram is an aberration diagram at the time of focusing to an object at infinity. Moreover, ω denotes a half angle of view.

Moreover, in the lens cross-sectional view of each example, a first lens unit is denoted by G1, a second lens unit is denoted by G2, a third lens unit is denoted by G3, a fourth lens unit is denoted by G4, a fifth lens unit is denoted by G5, a sixth lens unit is denoted by G6, a cover glass is denoted by C, and an image plane is denoted by I.

Although it is not shown in the diagrams, a plane parallel plate which forms a low-pass filter may be disposed between the fifth lens unit G5 and the image plane I, or the sixth lens unit G6 and the image plane I. A wavelength-region restricting coating which restricts infra-red rays may be applied to a surface of the plane parallel plate. Moreover, a multilayer film for wavelength-region restriction may be applied to a surface of the cover glass. Furthermore, the cover glass C may be imparted with an effect of a low-pass filter.

Moreover, in a case of using the single-focus optical system for image pickup, an image pickup element is disposed on the image plane I. Whereas, in a case of using the single-focus optical system for projection, a display element is disposed on the image plane I. In the description of an arrangement of each example, the description will be made assuming that the single-focus optical system is used for image pickup. Therefore, the enlargement side will be let to be an object side, and the reduction side will be let to be an image side.

A relationship of the abovementioned 'enlargement-side sub lens unit', 'predetermined sub lens unit', 'first sub lens unit', 'second sub lens unit', 'third sub lens unit', and 'fourth sub lens unit' with a first lens unit G1, a second lens unit G2, a third lens unit G3, a fourth lens unit G4, a fifth lens unit G5, and a sixth lens unit G6 in each example is shown in table 1.

TABLE 1

|  | Example 1 | Example 2 | Example 3 | Example 4 |
|---|---|---|---|---|
| Enlargement-side sub lens unit | First lens unit G1 | First lens unit G1 | First lens unit G1 | Nil |
| Predetermined sub lens unit | Second lens unit G2 | Second lens unit G2 | Second lens unit G2 | First lens unit G1 |
| First sub lens unit | Third lens unit G3 | Third lens unit G3 | Third lens unit G3 | Second lens unit G2 |

TABLE 1-continued

|  | Example 1 | Example 2 | Example 3 | Example 4 |
|---|---|---|---|---|
| Second sub lens unit | Fourth lens unit G4 | Fourth lens unit G4 | Fourth lens unit G4 | Third lens unit G3 |
| Third sub lens unit | Fifth lens unit G5 | Fifth lens unit G5 | Fifth lens unit G5 | Fourth lens unit G5 |
| Fourth sub lens unit | Sixth lens unit G6 | Sixth lens unit G6 | Sixth lens unit G6 | Fifth lens unit G5 |

A single-focus optical system according to an example 1 will be described below.

The single-focus optical system according to the example 1 includes in order from an object side, a first lens unit G1 having a negative refractive power, a second lens unit G2 having a positive refractive power, a third lens unit G3 having a positive refractive power, a fourth lens unit G4 having a negative refractive power, a fifth lens unit G5 having a positive refractive power, and a sixth lens unit G6 having a negative refractive power. The third lens unit G3 includes an aperture stop S.

The first lens unit G1 includes a negative meniscus lens L1 having a convex surface directed toward the object side and a negative meniscus lens L2 having a convex surface directed toward the object side.

The second lens unit G2 includes a positive meniscus lens L3 having a convex surface directed toward the object side, a negative meniscus lens L4 having a convex surface directed toward the object side, a negative meniscus lens L5 having a convex surface directed toward an image side, and a positive meniscus lens L6 having a convex surface directed toward the image side. Here, the positive meniscus lens L3 and the negative meniscus lens L4 are cemented. Moreover, the negative meniscus lens L5 and the positive meniscus lens L6 are cemented.

The third lens unit G3 includes a biconvex positive lens L7, a biconcave negative lens L8, a positive meniscus lens L9 having a convex surface directed toward the object side, a positive meniscus lens L10 having a convex surface directed toward the object side, and a biconvex positive lens L11. Here, the biconvex positive lens L7, the biconcave negative lens L8, and the positive meniscus lens L9 are cemented.

The fourth lens unit G4 includes a positive meniscus lens L12 having a convex surface directed toward the image side and a biconcave negative lens L13. Here, the positive meniscus lens L12 and the biconcave negative lens L13 are cemented.

The fifth lens unit G5 includes a positive meniscus lens L14 having a convex surface directed toward the image side and a biconvex positive lens L15.

The sixth lens unit G6 includes a negative meniscus lens L16 having a convex surface directed toward the image side.

Moreover, at the time of focusing from an object at infinity to an object at a close distance, the fifth lens unit G5 moves toward the object side along an optical axis.

An aspheric surface is provided to a total of three surfaces which are, an image-side surface of the negative meniscus lens L2, and both surfaces of the positive meniscus lens L14.

A single-focus optical system according to an example 2 will be described below.

The single-focus optical system according to the example 2 includes in order from an object side, a first lens unit G1 having a negative refractive power, a second lens unit G2 having a negative refractive power, a third lens unit G3 having a positive refractive power, a fourth lens unit G4 having a negative refractive power, a fifth lens unit G5 having a positive refractive power, and a sixth lens unit G6 having a negative refractive power. The third lens unit G3 includes an aperture stop S.

The first lens unit G1 includes a negative meniscus lens L1 having a convex surface directed toward the object side.

The second lens unit G2 includes a negative meniscus lens L2 having a convex surface directed toward the object side, a negative meniscus lens L3 having a convex surface directed toward an image side, and a positive meniscus lens L4 having a convex surface directed toward the image side. Here, the negative meniscus lens L3 and the positive meniscus lens L4 are cemented.

The third lens unit G3 includes a biconvex positive lens L5, a biconcave negative lens L6, a biconvex positive lens L7, a biconvex positive lens L8, and a biconvex positive lens L9. Here, the biconcave negative lens L6 and the biconvex positive lens L7 are cemented.

The fourth lens unit G4 includes a biconvex positive lens L10 and a biconcave negative lens L11. Here, the biconvex positive lens L10 and the biconcave negative lens L11 are cemented.

The fifth lens unit G5 includes a negative meniscus lens L12 having a convex surface directed toward the image side and a biconvex positive lens L13.

The sixth lens unit G6 includes a negative meniscus lens L14 having a convex surface directed toward the image side.

Moreover, at the time of focusing from an object at infinity to an object at a close distance, the fifth lens unit G5 moves toward the object side along an optical axis.

An aspheric surface is provided to a total of five surfaces which are, both surfaces of the negative meniscus lens L2, both surfaces of the biconvex positive lens L9, and an image-side surface of the negative meniscus lens L12.

A single-focus optical system according to an example 3 will be described below.

The single-focus optical system according to the example 3 includes in order from an object side, a first lens unit G1 having a negative refractive power, a second lens unit G2 having a negative refractive power, a third lens unit G3 having a positive refractive power, a fourth lens unit G4 having a negative refractive power, a fifth lens unit G5 having a positive refractive power, and a sixth lens unit G6 having a negative refractive power. The third lens unit G3 includes an aperture stop S.

The first lens unit G1 includes a negative meniscus lens L1 having a convex surface directed toward the object side.

The second lens unit G2 includes a negative meniscus lens L2 having a convex surface directed toward the object side, a negative meniscus lens L3 having a convex surface directed toward an image side, and a positive meniscus lens L4 having a convex surface directed toward the image side. Here, the negative meniscus lens L3 and the positive meniscus lens L4 are cemented.

The third lens unit G3 includes a biconvex positive lens L5, a biconcave negative lens L6, a positive meniscus lens L7 having a convex surface directed toward the object side, a biconvex positive lens L8, and a biconvex positive lens L9. Here, the biconvex positive lens L5, the biconcave negative lens L6, and the positive meniscus lens L7 are cemented.

The fourth lens unit G4 includes a biconvex positive lens L10 and a biconcave negative lens L11. Here, the biconvex positive lens L10 and the biconcave negative lens L11 are cemented.

The fifth lens unit G5 includes a biconcave negative lens L12 and a biconvex positive lens L13.

The sixth lens unit G6 includes a negative meniscus lens L14 having a convex surface directed toward the image side.

Moreover, at the time of focusing from an object at infinity to an object at a close distance, the fifth lens unit G5 moves toward the object side along an optical axis.

An aspheric surface is provided to a total of four surfaces which are, both surfaces of the negative meniscus lens L2 and both surfaces of the biconcave negative lens L12.

A single-focus optical system according to an example 4 will be described below.

The single-focus optical system according to the example 4 includes in order from an object side, a first lens unit G1 having a negative refractive power, a second lens unit G2 having a positive refractive power, a third lens unit G3 having a negative refractive power, a fourth lens unit G4 having a positive refractive power, and a fifth lens unit G5 having a negative refractive power. The second lens unit G2 includes an aperture stop S.

The first lens unit G1 includes a negative meniscus lens L1 having a convex surface directed toward the object side, a biconcave negative lens L2, and a biconvex positive lens L3. Here, the biconcave negative lens L2 and the biconvex positive lens L3 are cemented.

The second lens unit G2 includes a positive meniscus lens L4 having a convex surface directed toward an image side, a negative meniscus lens L5 having a convex surface directed toward the image side, a positive meniscus lens L6 having a convex surface directed toward the image side, a biconvex positive lens L7, and a biconvex positive lens L8. Here, the positive meniscus lens L4, the negative meniscus lens L5, and the positive meniscus lens L6 are cemented.

The third lens unit G3 includes a biconvex positive lens L9 and a biconcave negative lens L10. Here, the biconvex positive lens L9 and the biconcave negative lens L10 are cemented.

The fourth lens unit G4 includes a biconcave negative lens L11 and a biconvex positive lens L12.

The fifth lens unit G5 includes a negative meniscus lens L13 having a convex surface directed toward the object side.

Moreover, at the time of focusing from an object at infinity to an object at a close distance, the fourth lens unit G4 moves toward the object side along an optical axis.

An aspheric surface is provided to a total of three surfaces which are, an image-side surface of the negative meniscus lens L1 and both surfaces of the biconcave negative lens L11.

Next, numerical data of optical components configuring the single-focus optical system of each above example are shown. In numerical data of each example, r1, r2, . . . denotes a curvature radius of each lens surface, d1, d2, . . . denotes a thickness of each lens or an air distance between adjacent lens surfaces, nd1, nd2, . . . denotes a refractive index of each lens for d-line, v1, vd2, . . . denotes an Abbe number of each lens, denotes an aspherical surface. Moreover, in various data, * denotes a focal length of an imaging optical system as a whole, FNO. denotes an F number, ω denotes a half angle of view, IH denotes an image height, FB denotes a back focus, LTL denotes a lens total length. The lens total length is the distance from the frontmost lens surface to the rearmost lens surface plus back focus. The back focus is a unit which is expressed upon air conversion of a distance from the lens backmost surface to a paraxial image surface. Moreover, the unit of angle is ° (degree). Moreover, Infinity indicates the time of focusing to an object at infinity and Close distance indicates the time of focusing to an object at a close distance.

A shape of an aspherical surface is defined by the following expression where the direction of the optical axis is represented by z, the direction orthogonal to the optical axis is represented by y, a conical coefficient is represented by K, aspherical surface coefficients are represented by A4, A6, A8, A10, $$Z=(y^2/r)/[1+\{1-(1+k)(y/r)^2\}^{1/2}]+A4y^4+A6y^6+A8y^8+A10y^{10}$$

Further, in the aspherical surface coefficients, 'e-n' (where, n is an integral number) indicates '10$^{-n}$'. Moreover, these symbols are commonly used in the following numerical data for each example.

Example 1

| Unit mm Surface data | | | | |
|---|---|---|---|---|
| Surface no. | r | d | nd | vd |
| Object plane | ∞ | ∞ | | |
| 1 | 42.908 | 2.00 | 1.72916 | 54.68 |
| 2 | 20.321 | 4.58 | | |
| 3 | 28.000 | 2.00 | 1.69350 | 53.21 |
| 4* | 10.885 | 5.00 | | |
| 5 | 18.379 | 5.54 | 1.84666 | 23.78 |
| 6 | 74.991 | 1.50 | 2.00100 | 29.14 |
| 7 | 17.663 | 5.93 | | |
| 8 | −18.500 | 1.50 | 1.49700 | 81.61 |
| 9 | −266.020 | 7.10 | 1.83400 | 37.16 |
| 10 | −31.031 | 3.17 | | |
| 11 | 56.548 | 6.58 | 1.72916 | 54.68 |
| 12 | −31.211 | 1.50 | 1.69895 | 30.13 |
| 13 | 22.754 | 4.00 | 1.43875 | 94.93 |
| 14 | 182.833 | 0.40 | | |
| 15 | 25.179 | 4.98 | 1.80518 | 25.42 |
| 16 | 1424.620 | 1.20 | | |
| 17(Stop) | ∞ | 1.20 | | |
| 18 | 43.741 | 4.66 | 1.43875 | 94.93 |
| 19 | −35.941 | 0.40 | | |
| 20 | −78.587 | 4.26 | 1.43875 | 94.93 |
| 21 | −16.468 | 1.50 | 1.64769 | 33.79 |
| 22 | 80.038 | Variable | | |
| 23* | −69.005 | 2.00 | 1.88202 | 37.22 |
| 24* | −56.741 | 1.79 | | |
| 25 | 32.952 | 7.31 | 1.43875 | 94.93 |
| 26 | −16.318 | Variable | | |
| 27 | −50.000 | 2.00 | 2.00069 | 25.46 |
| 28 | −60.000 | 10.81 | | |
| 29 | ∞ | 4.00 | 1.51633 | 64.10 |
| 30 | ∞ | 0.80 | | |
| Image plane | ∞ | | | |

| Aspherical surface data |
|---|
| 4th surface |
| k = −1.025 |
| A4 = 4.67830e−05, A6 = 1.90334e−08, A8 = 3.68882e−10 |
| 23th surface |
| k = 0.000 |
| A4 = 5.61311e−05, A6 = 4.22640e−07, A8 = −4.60190e−09 |
| 24th surface |
| k = 0.000 |
| A4 = 1.08489e−04, A6 = 5.29311e−07, A8 = −2.43622e−09, A10 = −8.44061e−12 |

| Various data | |
|---|---|
| f | 10.20 |
| FNO. | 1.42 |

-continued

Unit mm
Surface data

| | | |
|---|---|---|
| 2ω | | 98.94 |
| IH | | 10.82 |
| FB(in air) | | 14.25 |
| LTL(in air) | | 102.77 |

| | infinity | Close distance |
|---|---|---|
| d22 | 4.31 | 3.30 |
| d26 | 2.10 | 3.12 |

Unit focal length f1 = −16.95    f2 = 352.69    f3 = 21.83    f4 = −37.25    f5 = 24.23
f6 = −333.12

Example 2

Unit mm
Surface data

| Surface no. | r | d | nd | vd |
|---|---|---|---|---|
| Object plane | ∞ | ∞ | | |
| 1 | 51.359 | 1.50 | 1.48749 | 70.23 |
| 2 | 17.447 | 4.00 | | |
| 3* | 28.000 | 1.05 | 1.49700 | 81.61 |
| 4* | 10.998 | 12.21 | | |
| 5 | −23.269 | 2.78 | 1.80400 | 46.57 |
| 6 | −263.331 | 7.00 | 1.84666 | 23.78 |
| 7 | −48.151 | 2.94 | | |
| 8 | 34.802 | 4.70 | 1.69680 | 55.53 |
| 9 | −69.074 | 4.34 | | |
| 10 | −29.726 | 1.00 | 1.69895 | 30.13 |
| 11 | 24.142 | 5.42 | 1.43875 | 94.93 |
| 12 | −69.211 | 0.40 | | |
| 13 | 43.592 | 5.43 | 1.80518 | 25.42 |
| 14 | −66.668 | 1.20 | | |
| 15(Stop) | ∞ | 1.20 | | |
| 16* | 23.844 | 6.23 | 1.49700 | 81.61 |
| 17* | −40.207 | 0.40 | | |
| 18 | 128.972 | 3.47 | 1.43875 | 94.93 |
| 19 | −28.860 | 1.50 | 1.64769 | 33.79 |
| 20 | 22.338 | Variable | | |
| 21 | −25.599 | 1.50 | 1.88202 | 37.22 |
| 22* | −35.024 | 0.74 | | |
| 23 | 40.421 | 6.59 | 1.43875 | 94.93 |
| 24 | −15.529 | Variable | | |
| 25 | −22.517 | 2.00 | 2.00069 | 25.46 |
| 26 | −25.897 | 10.75 | | |
| 27 | ∞ | 4.00 | 1.51633 | 64.10 |
| 28 | ∞ | 0.80 | | |
| Image plane | ∞ | | | |

Aspherical surface data

3rd surface k = 0.000
A4 = 1.97524e−05, A6 = −6.94238e−08, A8 = 3.02280e−10
4th surface k = −0.346
A4 = 2.6950e−06, A6 = −1.37276e−07, A8 = −9.71370e−11
16th surface k = 0.000
A4 = −4.23540e−06, A6 = −1.84329e−09, A8 = −1.18407e−10
17th surface k = 0.000
A4 = 1.83935e−05, A6 = −6.52797e−08, A8 = 1.06552e−10

-continued

Unit mm
Surface data

22th surface k = 0.000
A4 = 4.68770e−05, A6 = 1.64627e−07, A8 = 6.00709e−10

Various data

| | |
|---|---|
| f | 12.33 |
| FNO. | 1.43 |
| 2ω | 88.90 |
| IH | 10.82 |
| FB(in air) | 14.19 |
| LTL(in air) | 100.58 |

| | infinity | Close distance |
|---|---|---|
| d20 | 6.68 | 5.66 |
| d24 | 2.10 | 3.13 |

Unit focal length f1 = −55.00    f2 = −23.45    f3 = 19.93    f4 = −30.64    f5 = 31.74
f6 = −244.81

Example 3

Unit mm
Surface data

| Surface no. | r | d | nd | vd |
|---|---|---|---|---|
| Object plane | ∞ | ∞ | | |
| 1 | 44.532 | 2.00 | 1.48749 | 70.23 |
| 2 | 16.489 | 4.00 | | |
| 3* | 31.116 | 2.00 | 1.49700 | 81.61 |
| 4* | 9.958 | 12.94 | | |
| 5 | −17.003 | 1.50 | 1.49700 | 81.61 |
| 6 | −76.992 | 4.38 | 1.84666 | 23.78 |
| 7 | −39.331 | 3.17 | | |
| 8 | 46.215 | 6.20 | 1.72916 | 54.68 |
| 9 | −21.146 | 1.50 | 1.69895 | 30.13 |
| 10 | 31.663 | 3.46 | 1.43875 | 94.93 |
| 11 | 1873.641 | 0.40 | | |
| 12 | 30.282 | 5.04 | 1.80518 | 25.42 |
| 13 | −190.270 | 1.20 | | |
| 14(Stop) | ∞ | 1.20 | | |
| 15 | 40.175 | 4.44 | 1.43875 | 94.93 |
| 16 | −51.308 | 0.40 | | |
| 17 | 543.044 | 4.77 | 1.43875 | 94.93 |
| 18 | −18.150 | 1.50 | 1.64769 | 33.79 |
| 19 | 72.975 | Variable | | |
| 20* | −576.372 | 2.00 | 1.88202 | 37.22 |
| 21* | 208.102 | 0.40 | | |
| 22 | 33.612 | 7.78 | 1.43875 | 94.93 |
| 23 | −15.137 | Variable | | |
| 24 | −21.002 | 2.00 | 2.00069 | 25.46 |
| 25 | −24.744 | 10.73 | | |
| 26 | ∞ | 4.00 | 1.51633 | 64.10 |
| 27 | ∞ | 0.80 | | |
| Image plane | ∞ | | | |

Aspherical surface data

3rd surface k = 0.000
A4 = 3.33231e−05, A6 = −1.04214e−07, A8 = 6.27652e−10
4th surface k = −0.241
A4 = 6.68858e−06, A6 = −2.99234e−07, A8 = 3.41965e−10

-continued

Unit mm
Surface data

20th surface k = 0.000
A4 = −5.87962e−05, A6 = −3.15433e−07, A8 = 5.54064e−10
21th surface k = 0.000
A4 = 4.81270e−06, A6 = −1.79503e−07, A8 = 1.84575e−09,
A10 = −1.22394e−13

Various data

| | |
|---|---|
| f | 12.00 |
| FNO. | 1.43 |
| 2ω | 90.35 |
| IH | 10.82 |
| FB(in air) | 14.17 |
| LTL(in air) | 93.56 |

| | infinity | Close distance |
|---|---|---|
| d19 | 5.02 | 3.93 |
| d23 | 2.10 | 3.19 |

Unit focal length f1 = −55.00    f2 = −22.38    f3 = 20.18    f4 = −50.99    f5 = 28.34
f6 = −189.39

Example 4

Unit mm
Surface data

| Surface no. | r | d | nd | νd |
|---|---|---|---|---|
| Object plane | ∞ | ∞ | | |
| 1 | 102.262 | 2.00 | 1.51633 | 64.14 |
| 2* | 15.444 | 11.63 | | |
| 3 | −19.694 | 1.50 | 1.71545 | 33.68 |
| 4 | 117.851 | 3.59 | 1.98617 | 28.60 |
| 5 | −24.191 | 5.59 | | |
| 6 | −19.486 | 3.35 | 1.66041 | 58.22 |
| 7 | −13.479 | 1.50 | 1.73800 | 32.26 |
| 8 | −5708.705 | 3.00 | 1.87667 | 33.26 |
| 9 | −44.786 | 0.40 | | |
| 10 | 94.919 | 4.17 | 1.84666 | 23.78 |
| 11 | −65.478 | 1.20 | | |
| 12(Stop) | ∞ | 1.20 | | |
| 13 | 39.903 | 4.34 | 1.72916 | 54.68 |
| 14 | −132.248 | 0.41 | | |
| 15 | 32.534 | 5.92 | 1.72916 | 54.68 |
| 16 | −33.075 | 1.50 | 1.84666 | 23.78 |
| 17 | 20.135 | Variable | | |
| 18* | −576.372 | 2.00 | 1.88202 | 37.22 |
| 19* | 208.102 | 3.84 | | |
| 20 | 189.054 | 6.01 | 1.72916 | 54.68 |
| 21 | −19.946 | Variable | | |
| 22 | 112.017 | 2.00 | 1.85478 | 24.80 |
| 23 | 83.482 | 10.65 | | |
| 24 | ∞ | 4.00 | 1.51633 | 64.10 |
| 25 | ∞ | 0.80 | | |
| Image plane | ∞ | | | |

Aspherical surface data

2nd surface k = −0.926
A4 = 1.98735e−05, A6 = 2.12872e−08

-continued

Unit mm
Surface data

18th surface k = 0.000
A4 = −5.87962e−05, A6 = −3.15433e−07, A8 = 5.54064e−10
19th surface k = 0.000
A4 = −9.13484e−06, A6 = −2.28819e−07, A8 = 1.25592e−09

Various data

| | |
|---|---|
| f | 16.90 |
| FNO. | 1.43 |
| 2ω | 70.00 |
| IH | 10.82 |
| FB(in air) | 14.08 |
| LTL(in air) | 90.24 |

| | infinity | Close distance |
|---|---|---|
| d17 | 8.91 | 6.60 |
| d21 | 2.10 | 4.41 |

Unit focal length f1 = −90.77    f2 = 27.78    f3 = −52.53    f4 = 27.91    f5 = −396.19

Next, values of conditional expressions (1) to (16), and (A) to (C) in each example are given below. '-' (hyphen) indicates that there is no corresponding arrangement.

| | Example1 | Example2 |
|---|---|---|
| (1) $\|0.53 - \theta gF_{3N}\|/(70 - \nu d_{3N})$ | 0.001831 | 0.001831 |
| (2) $\|\theta gF_{3P} - 0.6\|/(\nu d_{3P} - 30)$ | −0.00361 | −0.00361 |
| (3) $(R_{11F} + R_{11R})/(R_{11F} - R_{11R})$ | 2.799397 | 2.028966 |
| (4) $(R_{3NF} + R_{3NR})/(R_{3NF} - R_{3NR})$ | 0.156708 | 0.103652 |
| (5) $(R_{21F} + R_{21R})/(R_{21F} - R_{21R})$ | 50.35923 | 2.293769 |
| (6) $(R_{21R} + R_{22F})/(R_{21R} - R_{22F})$ | −0.02314 | −0.35809 |
| (7) $(R_{22F} + R_{22R})/(R_{22F} - R_{22R})$ | −3.95261 | −2.87031 |
| (8) $SF_{3F} - SF_{3R}$ | 0.19083 | −0.07446 |
| (9) $(R_{41F} + R_{41R})/(R_{41F} - R_{41R})$ | −0.00915 | 1.418971 |
| (10) $(R_{51F} + R_{51R})/(R_{51F} - R_{51R})$ | 0.337613 | 0.444882 |
| (11) $\beta_{3PR}$ | 2.38805 | 2.3131 |
| (12) $Nd_{3PR}$ | 1.43875 | 1.497 |
| (13) $\nu d_{3PR}$ | 94.93 | 81.61 |
| (14) $\beta_{4NF}$ | 1.98559 | 1.98559 |
| (15) $Nd_{4NF}$ | 1.64769 | 1.64769 |
| (16) $\nu d_{4NF}$ | 33.79 | 33.79 |
| (A) $f/e_{N1F}$ | 0.248477 | 0.340464 |
| (B) $(f/e_{AS})/Fno$ | 0.342052 | 0.329924 |
| (C) $T_{air\_max}/\Sigma d$ | 0.06699 | 0.141359 |

| | Example3 | Example4 |
|---|---|---|
| (1) $\|0.53 - \theta gF_{3N}\|/(70 - \nu d_{3N})$ | 0.001831 | 0.001598 |
| (2) $\|\theta gF_{3P} - 0.6\|/(\nu d_{3P} - 30)$ | −0.00361 | −0.00326 |
| (3) $(R_{11F} + R_{11R})/(R_{11F} - R_{11R})$ | 2.176035 | — |
| (4) $(R_{3NF} + R_{3NR})/(R_{3NF} - R_{3NR})$ | −0.19916 | −1.00473 |
| (5) $(R_{21F} + R_{21R})/(R_{21F} - R_{21R})$ | 1.941355 | 1.355785 |
| (6) $(R_{21R} + R_{22F})/(R_{21R} - R_{22F})$ | −0.26129 | −0.12094 |
| (7) $(R_{22F} + R_{22R})/(R_{22F} - R_{22R})$ | −2.5231 | −9.75825 |
| (8) $SF_{3F} - SF_{3R}$ | 0.493857 | 6.023892 |
| (9) $(R_{41F} + R_{41R})/(R_{41F} - R_{41R})$ | 1.310484 | 4.247826 |
| (10) $(R_{51F} + R_{51R})/(R_{51F} - R_{51R})$ | 0.378966 | 0.809129 |
| (11) $\beta_{3PR}$ | 2.38805 | 2.27596 |
| (12) $Nd_{3PR}$ | 1.43875 | 1.72916 |
| (13) $\nu d_{3PR}$ | 94.93 | 54.68 |
| (14) $\beta_{4NF}$ | 1.98559 | 2.08446 |
| (15) $Nd_{4NF}$ | 1.64769 | 1.84666 |
| (16) $\nu d_{4NF}$ | 33.79 | 23.78 |
| (A) $f/e_{N1F}$ | 0.34956 | 0.773172 |
| (B) $(f/e_{AS})/Fno$ | 0.352806 | 0.48503 |
| (C) $T_{air\_max}/\Sigma d$ | 0.163005 | 0.152683 |

The optical apparatus of the present embodiment includes an image pickup apparatus and a projection apparatus. Concrete examples of the image pickup apparatus and the projection apparatus will be described below.

Figure 5:
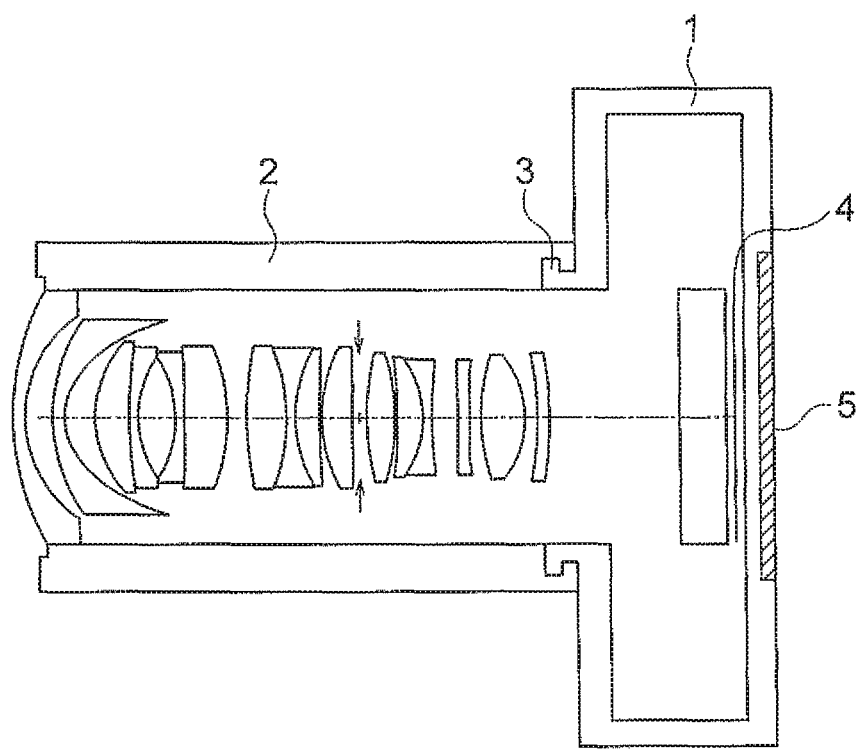
FIG. 5 is a cross-sectional view of an image pickup apparatus.

FIG. 5 is a cross-sectional view of a single-lens mirrorless camera as an electronic image pickup apparatus. In FIG. 5, a photographic optical system 2 is disposed inside a lens barrel of a single-lens mirrorless camera 1. A mount portion 3 enables the photographic optical system 2 to be detachable from a body of the single-lens mirrorless camera 1. As the mount portion 3, a mount such as a screw-type mount and a bayonet-type mount is to be used. In this example, a bayonet-type mount is used. Moreover, an image pickup element surface 4 and a back monitor 5 are disposed in the body of the single-lens mirrorless camera 1. As an image pickup element, an element such as a small-size CCD (charge coupled device) or a CMOS (complementary metal-oxide semiconductor) is to be used.

Moreover, as the photographic optical system 2 of the single-lens mirrorless camera 1, the single-focus optical system described in any one of the examples from the first example to the fourth example is to be used.

Figure 6:
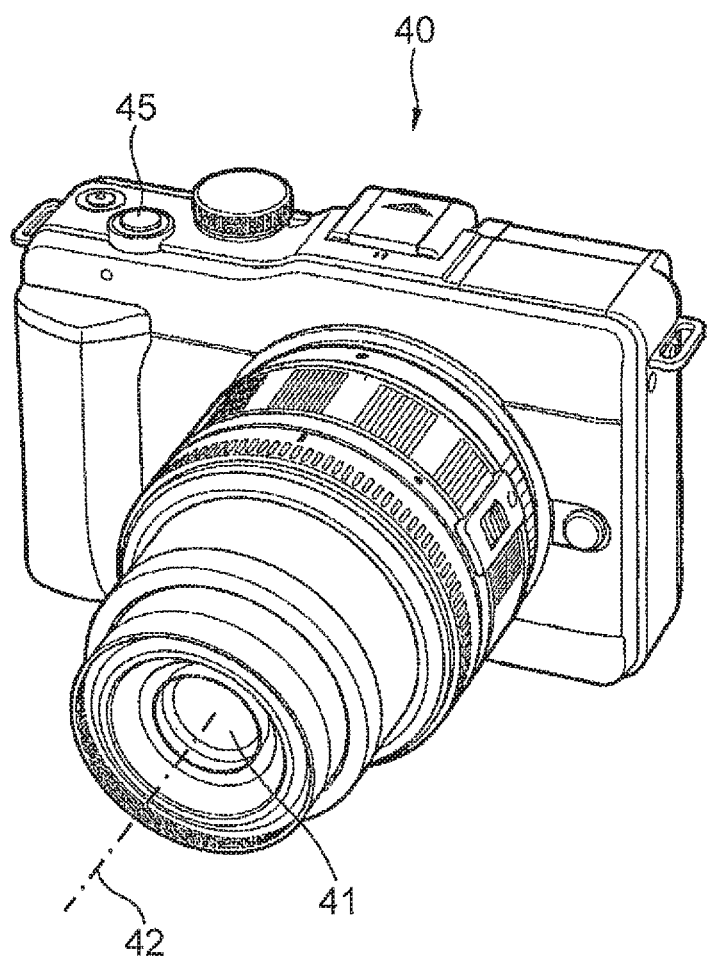
FIG. 6 is a front perspective view showing an appearance of the image pickup apparatus.
Figure 7:
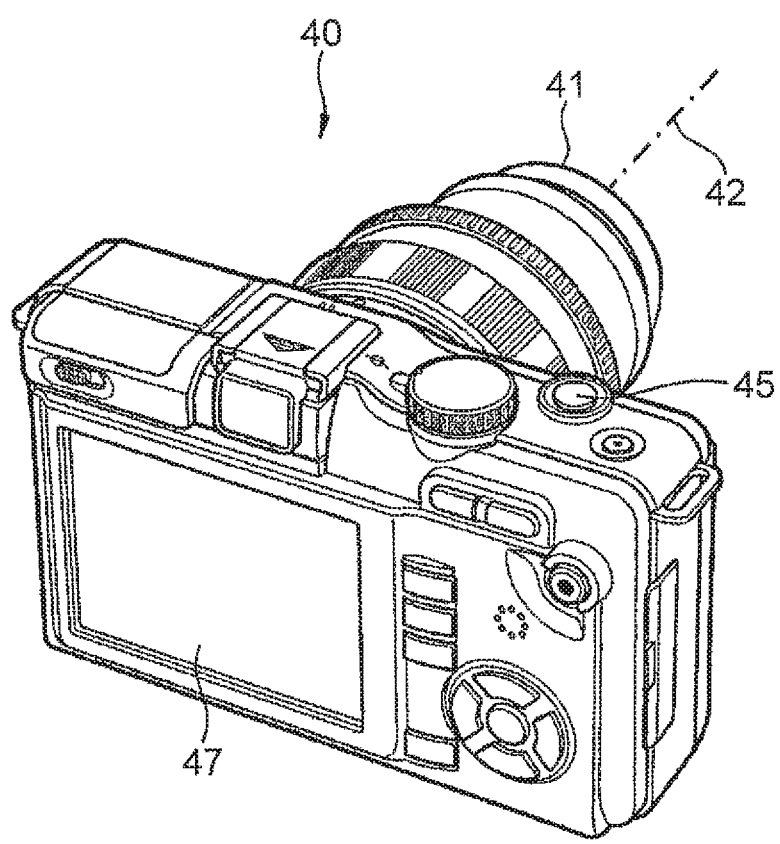
FIG. 7 is a rear perspective view of the image pickup apparatus.

FIG. 6 and FIG. 7 are conceptual diagrams of an arrangement of the image pickup apparatus. FIG. 6 is a front perspective view showing an appearance of a single-lens mirrorless camera 40 as the image pickup apparatus, and FIG. 7 is a rear perspective view of the single-lens mirrorless camera 40. The single-focus optical system according to the present examples from the first example to the fourth example is used in a photographic optical system 41 of the single-lens mirrorless camera 40.

The single-lens mirrorless camera 40 according to the present embodiment includes the photographic optical system 41 which is positioned in a photographic optical path 42, a shutter button 45, and a liquid-crystal display monitor 47. As the shutter button 45 disposed on an upper portion of the single-lens mirrorless camera 40 is pressed, in conjunction with the pressing of the shutter button 45, photography is carried out by the photographic optical system 41 such as the single-focus optical system according to the first example. An object image which is formed by the photographic optical system 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a storage means.

Figure 8:
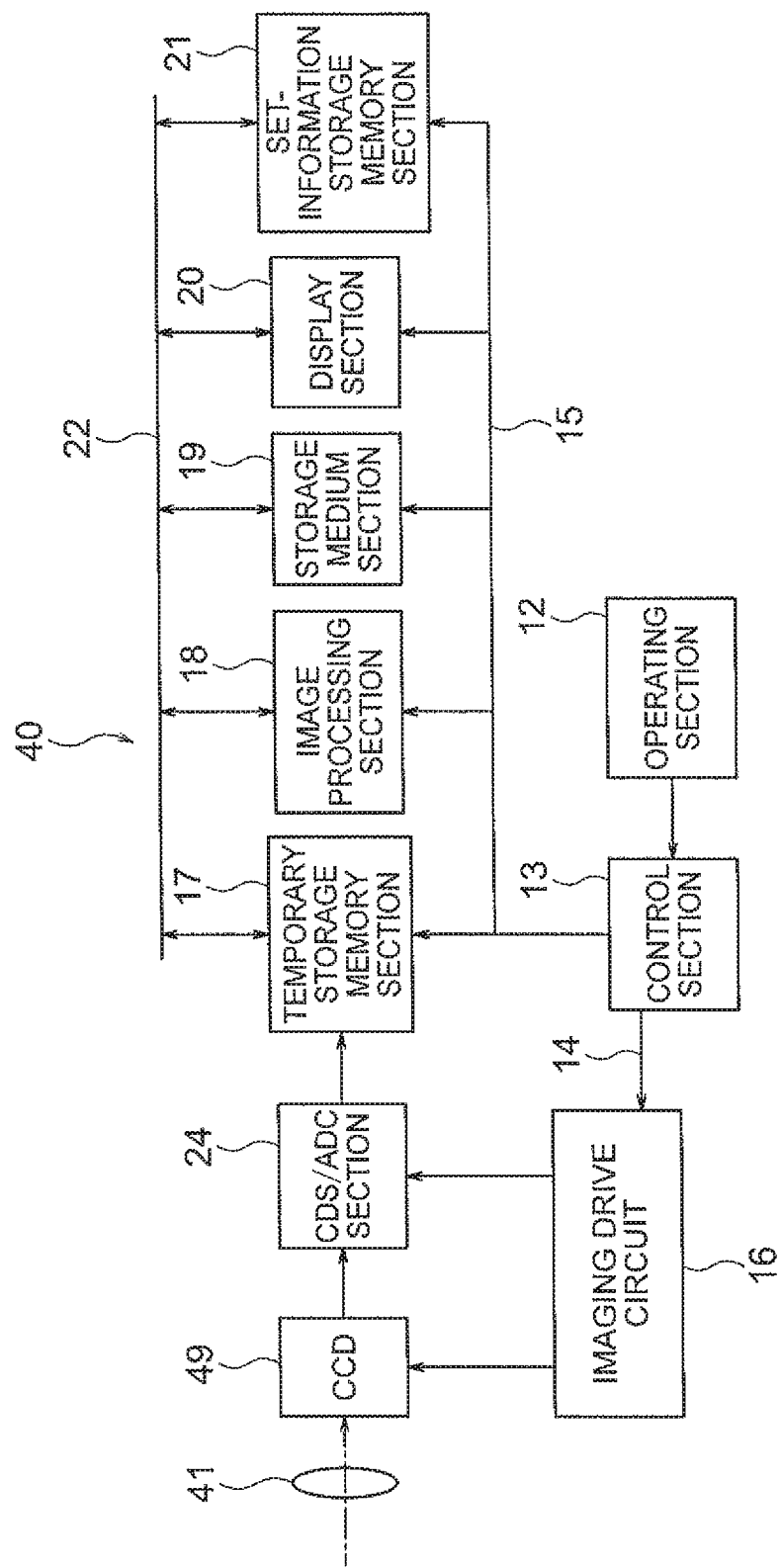
FIG. 8 is a structural block diagram of an internal circuit of main components of the image pickup apparatus.

FIG. 8 is a structural block diagram of an internal circuit of main components of the single-lens mirrorless camera 40. In the following description, the processing means described above includes for instance, a CDS/ADC section 24, a temporary storage memory 117, and an image processing section 18, and a storage means consists of a storage medium section 19 for example.

As shown in FIG. 8, the single-lens mirrorless camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the single-lens mirrorless camera) via these input buttons and switches. The control section 13 is a central processing unit (CPU), and has a built-in computer program memory which is not shown in the diagram. The control section 13 controls the entire single-lens mirrorless camera 40 according to a computer program stored in this computer program memory.

The CCD 49 is driven and controlled by the imaging drive circuit 16, and which converts an amount of light for each pixel of the object image formed by the photographic optical system 41 to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays photographed RAW data, image data and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section.

In the single-lens mirrorless camera 40 configured in such an arrangement, by adopting the single-focus optical system according to the present invention as the photographic optical system 41, it is possible to capture an image in a wide photography range with low noise at high resolution. Moreover, it is possible to use the single-focus optical system according to the present invention in an image pickup apparatus of a type having a quick-return mirror.

Figure 9:
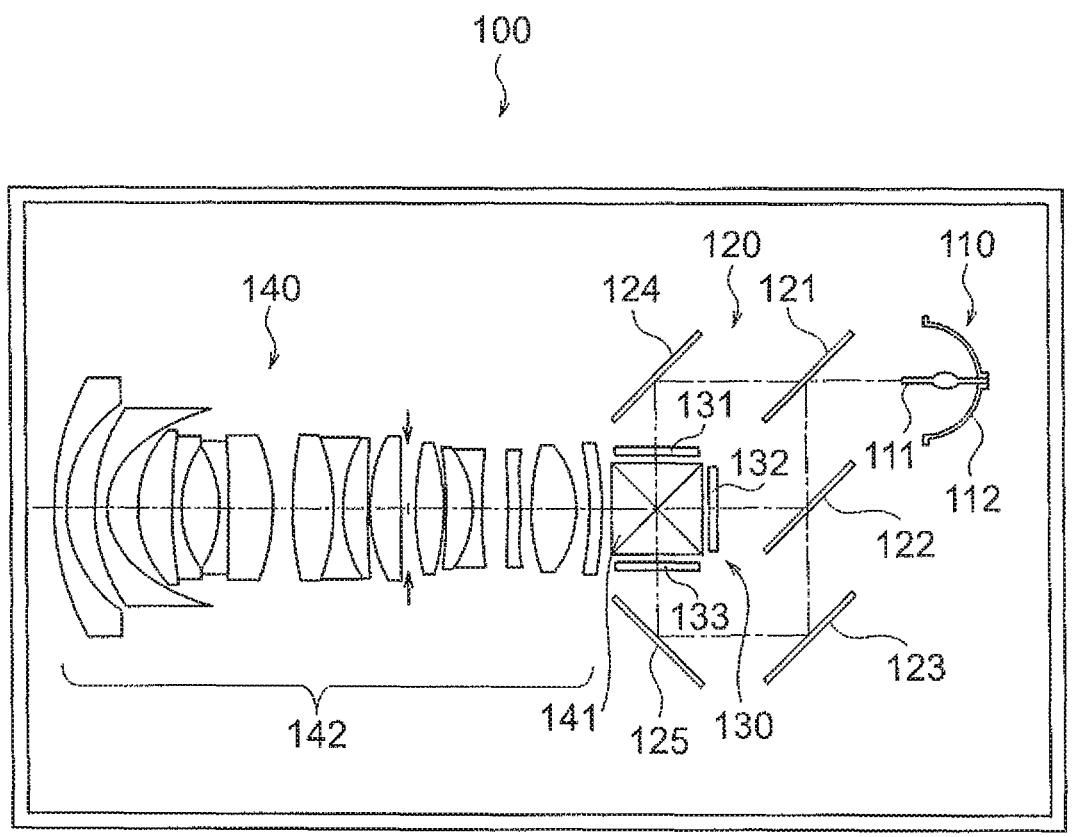
FIG. 9 is a cross-sectional view of a projection apparatus.

FIG. 9 is a sectional view of a projector as a projection apparatus. As illustrated in FIG. 9, a projector 100 includes a light source unit 110, an illumination unit 120, an image forming unit 130, and a projection unit 140.

The light source unit 110 includes a light source 111 and a reflective member 112. Illumination light is emitted from the light source 111. The illumination light is white light.

The illumination light is reflected by the reflective member 112 and enters the illumination unit 120.

The illumination unit 120 includes a first dichroic mirror 121, a second dichroic mirror 122, a third dichroic mirror 123, a first reflective member 124, and a second reflective member 125.

In the first dichroic mirror 121, light in the red wavelength range (hereinafter referred to as "red light") is transmitted, and light in the other wavelength ranges is reflected. In the second dichroic mirror 122, light in the green wavelength range (hereinafter referred to as "green light") is reflected, and light in the other wavelength ranges is transmitted. In the third dichroic mirror 123, light in the blue wavelength range (hereinafter referred to as "blue light") is reflected, and light in the other wavelength ranges is transmitted. The red light, the green light, and the blue light enter the image forming unit 130. A general plane reflector may be used instead of the third dichroic mirror 123.

The image forming unit 130 has a first display element 131, a second display element 132, and a third display element 133.

The first display element 131 is irradiated with red light through the first reflective member 124. The second display element 132 is irradiated with green light. The third display element 133 is irradiated with blue light through the second reflective member 125.

Here, an identical image is displayed on the first display element 131, the second display element 132, and the third display element 133. Thus, a red image is displayed on the first display element 131, a green image is displayed on the second display element 132, and a blue image is displayed on the third display element 133.

Lights emitted from the first display element 131, the second display element 132, and the third display element 133 enter the projection unit 140.

The projection unit 140 includes a dichroic prism. 141 and a projection optical system 142.

Lights emitted from the first display element 131, the second display element 132, and the third display element 133 are combined in the dichroic prism 141. As described above, a red image, a green image, and a blue image are displayed in the image forming unit 130. The three images are combined by the dichroic prism 141.

The projection optical system 142 projects the combined three images to a predetermined position. For example, the single-focus optical system illustrated in any one of examples from first examples to fourth example above is used for this projection optical system 142.

The image forming unit 130 may be a light valve such as a digital micromirror device (DMD). In this case, light from the light source unit 110 is reflected by the light valve, and the image from the light valve is magnified and projected by the projection unit 140.

In the projector 100 thus configured, the single-focus optical system focal length lens of the present invention is employed as the projection optical system 142, whereby it is possible to project an image in a wide projection range with low noise at high resolution.

According to the present embodiment, it is possible to provide a single-focus optical system in which various aberrations are corrected favorably even while having a wide angle of view and a small F-number, and an optical apparatus using the single-focus optical system.

As described heretofore, the single-focus optical system according to the present invention is suitable for a single-focus optical system in which various aberrations are corrected favorably even while having a wide angle of view and a small F-number. Moreover, the optical apparatus according to the present invention is suitable for an image pickup apparatus which captures a wide photographing range with a low noise and high resolution, and for a projection apparatus which projects an image over a wide projection range with a low noise and high resolution.

What is claimed is:

1. A single-focus optical system which forms a conjugate relationship between a conjugate point on an enlargement side where a distance is long and a conjugate point on a reduction side where a distance is short, the single-focus optical system comprising, in order from the enlargement side:

a front lens unit; and
a rear lens unit,
wherein:
the front lens unit includes a predetermined sub lens unit or includes, in order from the enlargement side, an enlargement-side sub lens unit and the predetermined sub lens unit,
the rear lens unit includes, in order from the enlargement side, a first sub lens unit, a second sub lens unit, a third sub lens unit, and a fourth sub lens unit,
a lens component is one of a single lens and a cemented lens,
the enlargement-side sub lens unit, in order from the enlargement side, includes only one negative lens component or includes a plurality of negative lens components,
the predetermined sub lens unit includes an enlargement-side meniscus lens component and a reduction-side meniscus lens component,
the enlargement-side meniscus lens component and the reduction-side meniscus lens component are disposed such that respective concave surfaces thereof are face-to-face,
the first sub lens unit includes a plurality of positive lenses and a first predetermined negative lens,
in the first predetermined negative lens, a lens surface on the enlargement side is concave toward the enlargement side,
one positive lens of the plurality of positive lenses is cemented to the reduction side of the first predetermined negative lens,
one positive lens of the plurality of positive lenses is cemented to the enlargement side of the first predetermined negative lens,
the second sub lens unit includes a predetermined negative lens component,
in the predetermined negative lens component, a lens surface on the reduction side is concave toward the reduction side,
the third sub lens unit includes a predetermined positive lens component which is positioned closest to the reduction side,
the fourth sub lens unit includes lens components that are all positioned on the reduction side of the predetermined positive lens component, and
the following conditional expression (7) is satisfied:

$$-100 < (R_{22F} + R_{22R})/(R_{22F} - R_{22R}) < -1.00 \quad (7)$$

where,
$R_{22F}$ denotes a paraxial radius of curvature of a lens surface positioned closest to the enlargement side of the reduction-side meniscus lens component, and $R_{22R}$ denotes a paraxial radius of curvature of a lens surface position closest to the reduction side of the reduction-side meniscus lens component.

2. The single-focus optical system according to claim 1, wherein at least one of the second sub lens unit and the third sub lens unit moves along an optical axis at a time of focusing.

3. The single-focus optical system according to claim 1, wherein:
the third sub lens unit includes only the predetermined positive lens component, or includes, in order from the enlargement side, one lens component and the predetermined positive lens component, and
an absolute value of a refractive power of the one lens component is smaller than an absolute value of a refractive power of the predetermined positive lens component.

4. The single-focus optical system according to claim 1, wherein one positive lens of the plurality of positive lenses is positioned closest to the reduction side.

5. The single-focus optical system according to claim 1, wherein lens components up to a second lens component counted from the closest reduction side include two lens surfaces that are convex toward the reduction side.

6. The single-focus optical system according to claim 1, wherein the following conditional expression (1) is satisfied:

$$|0.51-\theta gF_{3N}|/(70-vd_{3N})<1.950 \cdot 10^{-3} \quad (1)$$

where,
$\theta gF_{3N}$ denotes a partial dispersion ratio for the first predetermined negative lens, $vd_{3N}$ denotes Abbe number for the first predetermined negative lens, $$\theta gF_{3N}=(ng_{3N}-nF_{3N})/(nF_{3N}-nC_{3N})$$

$$vd_{3N}=(nd_{3N}-1)/(nF_{3N}-nC_{3N}),$$

and here
$nd_{3N}$, $nF_{3N}$, $nC_{3N}$, and $ng_{3N}$ are a refractive index for a d-line, a refractive index for an F-line, a refractive index for a C-line, and a refractive index for a g-line respectively.

7. The single-focus optical system according to claim 1, wherein the following conditional expression (2) is satisfied:

$$|\theta gF_{3P}-0.6|/(vd_{3P}-30)<2.000 \cdot 10^{-3} \quad (2)$$

where,
$\theta gF_{3P}$ denotes a partial dispersion ratio for the predetermined positive lens,
$vd_{3P}$ denotes Abbe number for the predetermined positive lens, $$\theta gF_{3P}=(ng_{3P}-nF_{3P})/(nF_{3P}-nC_{3P})$$

$$vd_{3P}=(nd_{3P}-1)/(nF_{3P}-nC_{3P}),$$

and here
$nd_{3P}$, $nF_{3P}$, $nC_{3P}$, and $ng_{3P}$ are a refractive index for a d-line, a refractive index for an F-line, a refractive index for a C-line, and a refractive index for a g-line respectively, and
the predetermined positive lens is at least one positive lens positioned on the reduction side of the first predetermined negative lens, of the plurality of positive lenses.

8. The single-focus optical system according to claim 1, wherein the following conditional expression (4) is satisfied:

$$-1.2<(R_{3NF}+R_{3NR})/(R_{3NF}-R_{3NR})<1.0 \quad (4)$$

where,
$R_{3NF}$ denotes a paraxial radius of curvature of an enlargement-side lens surface of the first predetermined negative lens, and
$R_{3NR}$ denotes a paraxial radius of curvature of a reduction-side lens surface of the first predetermined negative lens.

9. The single-focus optical system according to claim 1, wherein the following conditional expression (5) is satisfied:

$$0.50<(R_{21F}+R_{21R})/(R_{21F}-R_{21R})<100 \quad (5)$$

where,
$R_{21F}$ denotes a paraxial radius of curvature of a lens surface positioned closest to the enlargement side of the enlargement-side meniscus lens component, and
$R_{21R}$ denotes a paraxial radius of curvature of a lens surface positioned closest to the reduction side of the enlargement-side meniscus lens component.

10. The single-focus optical system according to claim 1, wherein the following conditional expression (6) is satisfied:

$$-0.8<(R_{21R}+R_{22F})/(R_{21R}-R_{22F})<0.5 \quad (6)$$

where,
$R_{21R}$ denotes a paraxial radius of curvature of a lens surface positioned closest to the reduction side of the enlargement-side meniscus lens component, and
$R_{22F}$ denotes a paraxial radius of curvature of a lens surface positioned closest to the enlargement side of the reduction-side meniscus lens component.

11. The single-focus optical system according to claim 1, wherein the following conditional expression (8) is satisfied:

$$-1.0<SF_{3F}-SF_{3R}<10.0 \quad (8)$$

where, $$SF_{3F}=(R_{3FF}+R_{3FR})/(R_{3FF}-R_{3FR}),$$

$$SF_{3R}=(R_{3RF}+R_{3RR})/(R_{3RF}-R_{3RR}),$$

and here
$R_{3FF}$ denotes a paraxial radius of curvature of an enlargement-side lens surface of an enlargement-side positive lens,
$R_{3FR}$ denotes a paraxial radius of curvature of a reduction-side lens surface of the enlargement-side positive lens,
$R_{3RF}$ denotes a paraxial radius of curvature of an enlargement-side lens surface of a reduction-side positive lens,
$R_{3RR}$ denotes a paraxial radius of curvature of a reduction-side lens surface of the reduction-side positive lens, where
the enlargement-side positive lens is a positive lens which is positioned closest to the enlargement side, of the plurality of positive lenses, and
the reduction-side positive lens is a positive lens which is positioned closest to the reduction side, of the plurality of positive lenses.

12. The single-focus optical system according to claim 1, wherein the following conditional expression (9) is satisfied:

$$-1.0<(R_{41F}+R_{41R})/(R_{41F}-R_{41R})<10.0 \quad (9)$$

where,
$R_{41F}$ denotes a paraxial radius of curvature of a lens surface positioned closest to the enlargement side of the predetermined negative lens component, and
$R_{41R}$ denotes a paraxial radius of curvature of a lens surface positioned closest to the reduction side of the predetermined negative lens component.

13. The single-focus optical system according to claim 1, wherein the following conditional expression (10) is satisfied:

$$-1.0<(R_{51F}+R_{51R})/(R_{51F}-R_{51R})<2.0 \quad (10)$$

where,
$R_{51F}$ denotes a paraxial radius of curvature of a lens surface positioned closest to the enlargement side of the predetermined positive lens component, and
$R_{51R}$ denotes a paraxial radius of curvature of a lens surface positioned closest to the reduction side of the predetermined positive lens component.

14. The single-focus optical system according to claim 1, wherein in an orthogonal coordinate system in which a horizontal axis is let to be $Nd_{3PR}$ and a vertical axis is let to be $vd_{3PR}$, when a straight line indicated by $Nd_{3PR}=\alpha \cdot vd_{3PR}+\beta_{3PR}$, where $\alpha=-0.01$, is set, $Nd_{3PR}$ and $vd_{3PR}$ of a reduction-side positive lens are included in both of an area determined by a straight line when a lower limit value $\beta_{3PR}$ of a range of the following conditional expression (11) is $\beta_{3PR}=2.25$, and an area determined by the following conditional expressions (12) and (13):

$$2.25 \le \beta_{3PR} \quad (11)$$

$$1.40 < Nd_{3PR} \quad (12)$$

$$35 < vd_{3PR} \quad (13)$$

where,
$Nd_{3PR}$ denotes a refractive index of the reduction-side positive lens for a d-line,
$vd_{3PR}$ denotes Abbe number for the reduction-side positive lens, and
the reduction-side positive lens is a positive lens positioned closest to the reduction side, of the plurality of positive lenses.

15. The single-focus optical system according to claim 1, wherein:
the predetermined negative lens component includes a second predetermined negative lens, and
in an orthogonal coordinate system in which a horizontal axis is let to be $Nd_{4NF}$ and a vertical axis is let to be $vd_{4NF}$, when a straight line indicated by $Nd_{4NF}=\alpha \cdot vd_{4NF}+\beta_{4NF}$, where $\alpha=-0.01$, is set, $Nd_{4NF}$ and $vd_{4NF}$ of the predetermined negative lens are included in both of an area determined by a straight line when a lower limit value $\beta_{4NF}$ of a range of the following conditional expression (14) is $\beta_{4NF}=1.95$, and an area determined by the following conditional expressions (15) and (16):

$$1.95 \le \beta_{4NF} \quad (14)$$

$$1.60 < Nd_{4NF} \quad (15)$$

$$23 < vd_{4NF} \quad (16)$$

where,
$Nd_{4NF}$ denotes a refractive index of the second predetermined negative lens for a d-line, and
$vd_{4NF}$ denotes Abbe number for the second predetermined negative lens.

16. The single-focus optical system according to claim 1, wherein:
the enlargement-side sub lens unit includes an enlargement-side negative lens component closest to the enlargement side, and
the following conditional expression (A) is satisfied:

$$0 < f/e_{N1F} < 2 \quad (A)$$

where,
f denotes a focal length of the overall single-focus optical system at the time of focusing to an object at infinity, and
$e_{N1F}$ denotes a maximum effective aperture of the enlargement-side negative lens component in the first lens unit.

17. The single-focus optical system according to claim 1, comprising:
an aperture stop, wherein
the following conditional expression (B) is satisfied:

$$0 < (f/e_{AS})/Fno < 2 \quad (B)$$

where,
f denotes a focal length of the overall single-focus optical system at the time of focusing to an object at infinity,
$e_{AS}$ denotes a maximum diameter of the aperture stop, and
Fno denotes an F-number for the overall single-focus optical system at the time of focusing to an object at infinity.

18. The single-focus optical system according to claim 1, wherein the following conditional expression (C) is satisfied:

$$0 < T_{air\_max}/\Sigma d \le 0.27 \quad (C)$$

where,
$T_{air\_max}$ is a largest axial air space in the range from a surface positioned closest to the enlargement side to a surface positioned closest to the reduction side in the single-focus optical system, and
$\Sigma d$ is an axial distance from the surface positioned closest to the enlargement side to the surface positioned closest to the reduction side in the single-focus optical system.

19. An optical apparatus, comprising:
an optical system; and
an image pickup element which is disposed on a reduction side, wherein
the image pickup element has an image pickup surface, and converts an image formed on the image pickup surface by the optical system to an electric signal, and
the optical system is the single-focus optical system according to claim 1.

20. An optical apparatus, comprising:
an optical system; and
a display element which is disposed on a reduction side, wherein
the display element has a display surface, and
an image displayed on the display surface is projected on the enlargement side by the optical system, and
the optical system is the single-focus optical system according to claim 1.

21. A single-focus optical system which forms a conjugate relationship between a conjugate point on an enlargement side where a distance is long and a conjugate point on a reduction side where a distance is short, the single-focus optical system comprising, in order from the enlargement side:
a front lens unit; and
a rear lens unit, wherein:
the front lens unit includes a predetermined sub lens unit or includes, in order from the enlargement side, an enlargement-side sub lens unit and the predetermined sub lens unit,
the rear lens unit includes, in order from the enlargement side, a first sub lens unit, a second sub lens unit, a third sub lens unit, and a fourth sub lens unit,
a lens component is one of a single lens and a cemented lens, the enlargement-side sub lens unit, in order from the enlargement side, includes only one negative lens component or includes a plurality of negative lens components, the predetermined sub lens unit includes an enlargement-side meniscus lens component and a reduction-side meniscus lens component, the reduction-side meniscus lens component includes, in order from the enlargement side, a negative lens and a positive lens, the enlargement-side meniscus lens component and the reduction-side meniscus lens component are disposed such that respective concave surfaces thereof are face-to-face, the first sub lens unit includes a plurality of positive lenses and a first predetermined negative lens, in the first predetermined negative lens, a lens surface on the enlargement side is concave toward the enlargement side, one positive lens of the plurality of positive lenses is cemented to the reduction side of the first predetermined negative lens, the second sub lens unit includes a predetermined negative lens component, in the predetermined negative lens component, a lens surface on the reduction side is concave toward the reduction side, the third sub lens unit includes a predetermined positive lens component which is positioned closest to the reduction side, the fourth sub lens unit includes lens components that are all positioned on the reduction side of the predetermined positive lens component, and the following conditional expression (7) is satisfied:

$$-100<(R_{22F}+R_{22R})/(R_{22F}-R_{22R})<-1.00 \quad (7)$$

where, $R_{22F}$ denotes a paraxial radius of curvature of a lens surface positioned closest to the enlargement side of the reduction-side meniscus lens component, and $R_{22R}$ denotes a paraxial radius of curvature of a lens surface position closest to the reduction side of the reduction-side meniscus lens component.

22. A single-focus optical system which forms a conjugate relationship between a conjugate point on an enlargement side where a distance is long and a conjugate point on a reduction side where a distance is short, the single-focus optical system comprising, in order from the enlargement side:

a front lens unit; and
a rear lens unit, wherein:
the front lens unit includes a predetermined sub lens unit or includes, in order from the enlargement side, an enlargement-side sub lens unit and the predetermined sub lens unit,
the rear lens unit includes, in order from the enlargement side, a first sub lens unit, a second sub lens unit, a third sub lens unit, and a fourth sub lens unit,
a lens component is one of a single lens and a cemented lens,
the enlargement-side sub lens unit, in order from the enlargement side, includes only one negative lens component or includes a plurality of negative lens components,
the predetermined sub lens unit includes an enlargement-side meniscus lens component and a reduction-side meniscus lens component, the enlargement-side meniscus lens component and the reduction-side meniscus lens component are disposed such that respective concave surfaces thereof are face-to-face, the first sub lens unit includes a plurality of positive lenses and a first predetermined negative lens, an absolute value of a refractive power of the first predetermined negative lens is larger than an absolute value of a refractive power of each positive lens of the plurality of positive lenses, in the first predetermined negative lens, a lens surface on the enlargement side is concave toward the enlargement side, one positive lens of the plurality of positive lenses is cemented to the reduction side of the first predetermined negative lens, the second sub lens unit includes a predetermined negative lens component, in the predetermined negative lens component, a lens surface on the reduction side is concave toward the reduction side, the third sub lens unit includes a predetermined positive lens component which is positioned closest to the reduction side, the fourth sub lens unit includes lens components that are all positioned on the reduction side of the predetermined positive lens component, and the following conditional expression (7) is satisfied:

$$-100<(R_{22F}+R_{22R})/(R_{22F}-R_{22R})<-1.00 \quad (7)$$

where, $R_{22F}$ denotes a paraxial radius of curvature of a lens surface positioned closest to the enlargement side of the reduction-side meniscus lens component, and $R_{22R}$ denotes a paraxial radius of curvature of a lens surface position closest to the reduction side of the reduction-side meniscus lens component.

23. A single-focus optical system which forms a conjugate relationship between a conjugate point on an enlargement side where a distance is long and a conjugate point on a reduction side where a distance is short, the single-focus optical system comprising, in order from the enlargement side:

a front lens unit; and
a rear lens unit, wherein:
the front lens unit includes a predetermined sub lens unit or includes, in order from the enlargement side, an enlargement-side sub lens unit and the predetermined sub lens unit,
the rear lens unit includes, in order from the enlargement side, a first sub lens unit, a second sub lens unit, a third sub lens unit, and a fourth sub lens unit,
a lens component is one of a single lens and a cemented lens,
the enlargement-side sub lens unit, in order from the enlargement side, includes only one negative lens component or includes a plurality of negative lens components,
the predetermined sub lens unit includes an enlargement-side meniscus lens component and a reduction-side meniscus lens component,
the enlargement-side meniscus lens component and the reduction-side meniscus lens component are disposed such that respective concave surfaces thereof are face-to-face,
the first sub lens unit includes a plurality of positive lenses and a first predetermined negative lens, in the first predetermined negative lens, a lens surface on the enlargement side is concave toward the enlargement side, one positive lens of the plurality of positive lenses is cemented to the reduction side of the first predetermined negative lens, the second sub lens unit includes a predetermined negative lens component, the predetermined negative lens component is a cemented lens which includes a positive lens disposed on the enlargement side and a negative lens disposed on the reduction side, an aperture stop is disposed between the first predetermined negative lens and the predetermined negative lens component, in the predetermined negative lens component, a lens surface on the reduction side is concave toward the reduction side, the third sub lens unit includes a predetermined positive lens component which is positioned closest to the reduction side, the fourth sub lens unit includes lens components that are all positioned on the reduction side of the predetermined positive lens component, and the following conditional expression (7) is satisfied:

$$-100<(R_{22F}+R_{22R})/(R_{22F}-R_{22R})<-1.00 \qquad (7)$$

where, $R_{22F}$ denotes a paraxial radius of curvature of a lens surface positioned closest to the enlargement side of the reduction-side meniscus lens component, and $R_{22R}$ denotes a paraxial radius of curvature of a lens surface position closest to the reduction side of the reduction-side meniscus lens component.

24. A single-focus optical system which forms a conjugate relationship between a conjugate point on an enlargement side where a distance is long and a conjugate point on a reduction side where a distance is short, the single-focus optical system comprising, in order from the enlargement side:

a front lens unit; and a rear lens unit, wherein:

the front lens unit includes a predetermined sub lens unit or includes, in order from the enlargement side, an enlargement-side sub lens unit and the predetermined sub lens unit, the rear lens unit includes, in order from the enlargement side, a first sub lens unit, a second sub lens unit, a third sub lens unit, and a fourth sub lens unit, a lens component is one of a single lens and a cemented lens, the enlargement-side sub lens unit, in order from the enlargement side, includes only one negative lens component or includes a plurality of negative lens components, the enlargement-side sub lens unit includes an enlargement-side negative lens component, the enlargement-side negative lens component is a negative lens component having a meniscus shape positioned closest to the enlargement side of the enlargement-side sub lens unit, the predetermined sub lens unit includes an enlargement-side meniscus lens component and a reduction-side meniscus lens component, the enlargement-side meniscus lens component and the reduction-side meniscus lens component are disposed such that respective concave surfaces thereof are face-to-face, the first sub lens unit includes a plurality of positive lenses and a first predetermined negative lens, in the first predetermined negative lens, a lens surface on the enlargement side is concave toward the enlargement side, one positive lens of the plurality of positive lenses is cemented to the reduction side of the first predetermined negative lens, the second sub lens unit includes a predetermined negative lens component, in the predetermined negative lens component, a lens surface on the reduction side is concave toward the reduction side, the third sub lens unit includes a predetermined positive lens component which is positioned closest to the reduction side, the fourth sub lens unit includes lens components that are all positioned on the reduction side of the predetermined positive lens component, and the following conditional expression (7) is satisfied:

$$-100<(R_{22F}+R_{22R})/(R_{22F}-R_{22R})<-1.00 \qquad (7)$$

where, $R_{22F}$ denotes a paraxial radius of curvature of a lens surface positioned closest to the enlargement side of the reduction-side meniscus lens component, and $R_{22R}$ denotes a paraxial radius of curvature of a lens surface position closest to the reduction side of the reduction-side meniscus lens component.

25. The single-focus optical system according to claim 24, wherein the following conditional expression (3) is satisfied:

$$0.65<(R_{11F}-R_{11R})/(R_{11F}-R_{11R})<4.0 \qquad (3)$$

where, $R_{11F}$ denotes a paraxial radius of curvature of a lens surface positioned closest to the enlargement side of the enlargement-side negative lens component, and $R_{11R}$ denotes a paraxial radius of curvature of a lens surface positioned closest to the reduction side of the enlargement-side negative lens component.

* * * * *